United States Patent [19]

Kossiakoff et al.

[11] 4,005,415
[45] Jan. 25, 1977

[54] AUTOMATED RADAR DATA PROCESSING SYSTEM

[75] Inventors: Alexander Kossiakoff, Brookville; James R. Austin, Gaithersburg, both of Md.

[73] Assignee: The United States of America as represented by the Secretary of the Navy, Washington, D.C.

[22] Filed: Mar. 31, 1975

[21] Appl. No.: 563,908

[52] U.S. Cl. .............................................. 343/5 VQ
[51] Int. Cl.² ............................................ G01S 9/02
[58] Field of Search ....................... 343/5 DP, 5 VQ

[56] References Cited

UNITED STATES PATENTS

| | | | |
|---|---|---|---|
| 3,213,448 | 10/1965 | Foley | 343/5 DP X |
| 3,353,177 | 11/1967 | Wilmot | 343/5 DP |
| 3,359,442 | 12/1967 | Groginsky | 343/5 DP |
| 3,460,137 | 8/1969 | Ralston | 343/5 DP |
| 3,680,095 | 7/1972 | Evans | 343/5 DP X |
| 3,836,964 | 9/1974 | Evans | 343/5 DP X |
| 3,870,992 | 3/1975 | Hanna, Jr. | 343/5 DP |
| 3,919,707 | 11/1975 | Evans | 343/5 DP |

*Primary Examiner*—Malcolm F. Hubler

[57] ABSTRACT

An automated radar data processing system comprised of signal processing circuitry and programmed general purpose digital computer apparatus performs detection, classification and tracking of all targets within the field of view of the radar. The signal processing circuitry includes an adaptive video processor which receives the raw radar video signals and which derives a threshold from the noise, clutter, or electronic countermeasures signals in the immediate vicinity of the target and passes only those incoming signals which satisfy the detection criteria in terms of signal to noise ratio and extent. The signal processing circuitry is interactive with target track data derived and stored in the computer apparatus, so that the specific signal processing applied to any target by the adaptive video processor is optimized in accordance with the track status of that target. The proposed system also better enables a human operator to take a system management position wherein he can set up or establish data processing conditions so as, for example, to optimize target detection in highly variable or critical environments.

20 Claims, 24 Drawing Figures

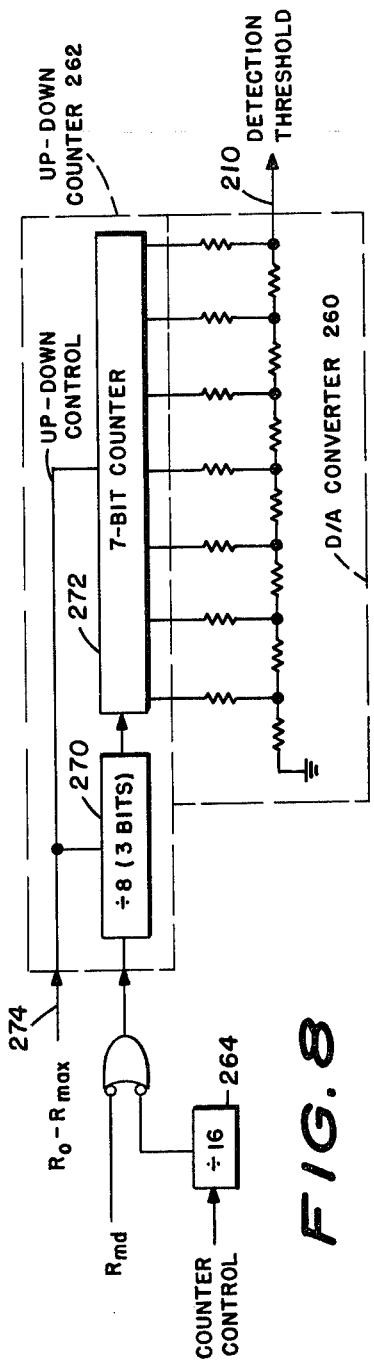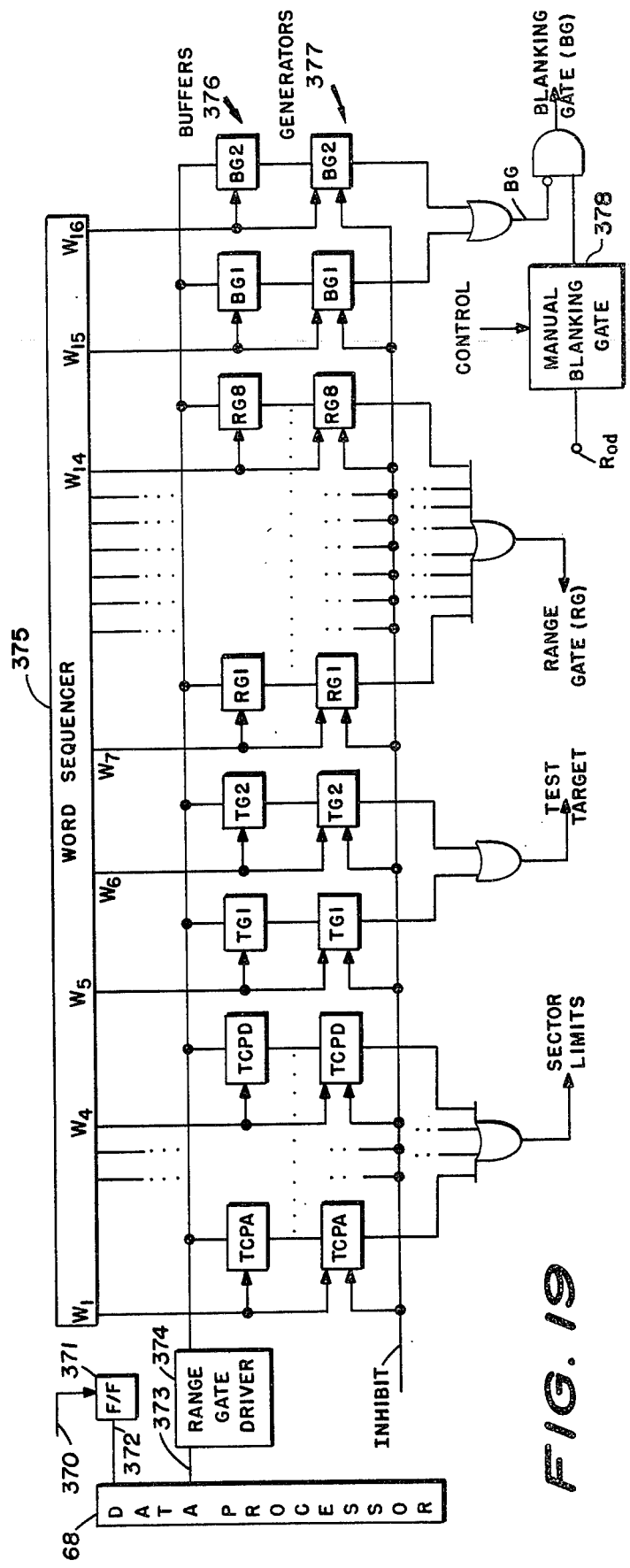

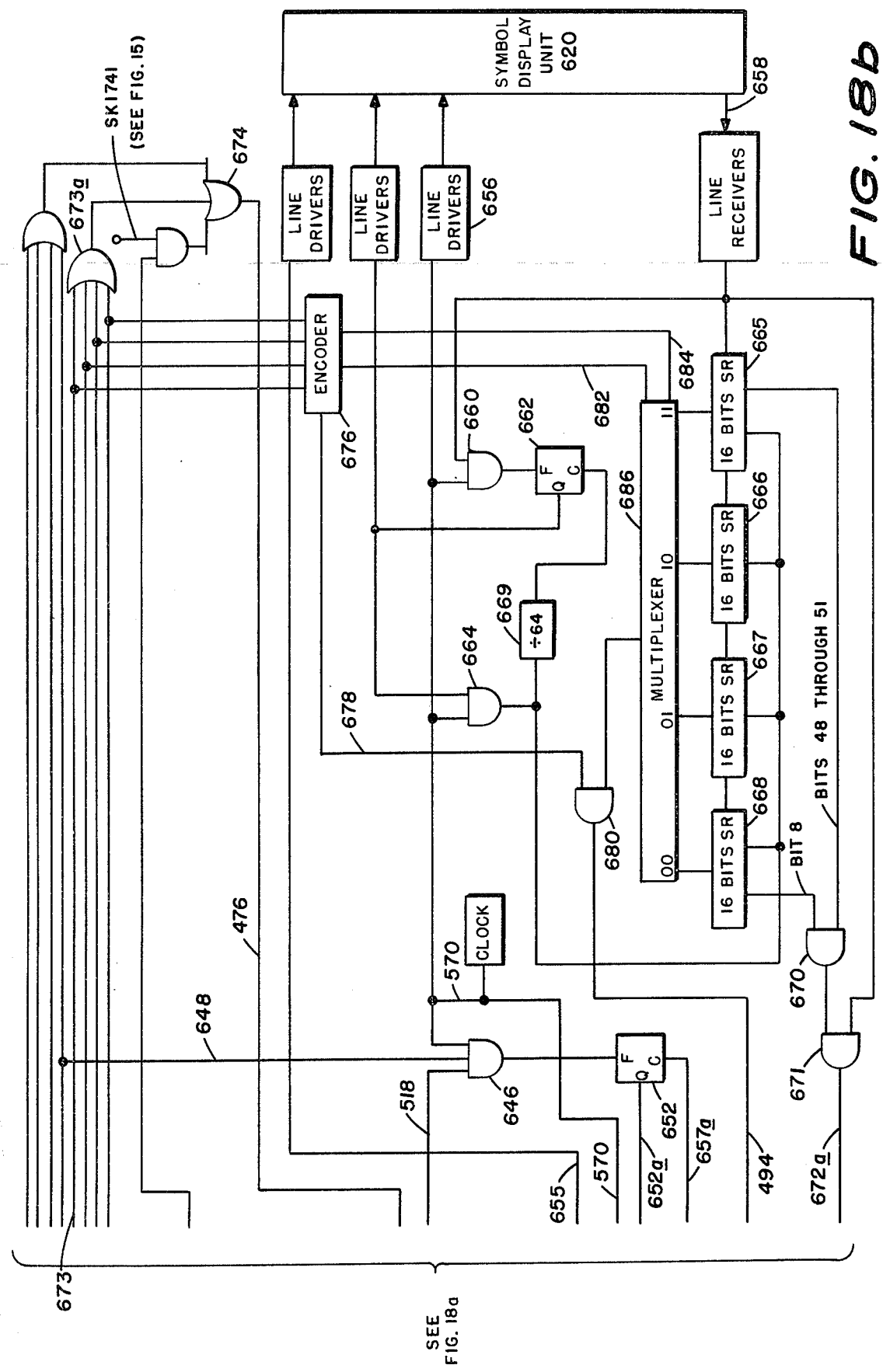

AUTOMATED RADAR DATA PROCESSING SYSTEM

BACKGROUND OF THE INVENTION

One of the basic operational limitations of anti-air warfare is the operational speed of the search radar and the length of time necessary to process targets through to weapons control. These limitations are due primarily to the limitations imposed by environmental conditions on the detection and tracking capability of the radar operator. In the past, various types of automatic radar processing systems have been developed. However, the design of such systems are constrained by the physical properties of the radar environment, the effect of the environment on the radar signal characteristics, and the acceptable false alarm rate which is established by the user. Moreover, none of the prior automatic systems have provided a comprehensive system which takes into account all of these aforementioned constraints. Prior systems usually adopted one of two possible courses: provide individually designed, special purpose hardware; or use general purpose hardware in combination with data processors. Of course both approaches have had individual drawbacks and deficiencies, not the least of which has been system cost versus end result. There have also been many automatic units employed to perform individual specialized radar system functions such as adaptive video threshold units and automatic radar signal processors. Completely automated radar data processing systems have not heretofore been readily available, due in large part to the unavailability of compact digital data processors. Moreover, such fully automated systems fail to afford the operator with the opportunity to take a systems management position and thereby participate in setting up processing conditions, so as to better optimize system performance. System size as well as cost is also an important consideration in any automated radar data processing system, since, if intended for shipboard use, for example, space is always at a premium. Past systems of the automatic variety were also generally deficient in keeping the users informed on a real-time basis. Even though a system may be almost totally self-sufficient, i.e., detection, processing and, say, gun control is carried on with no operator interventions, it is important to keep the users apprised of the current target status and to permit the operator to assume a system management position at times. Thus, it is felt necessary and desirable to involve the operator not only as a failure monitoring operation and to build confidence in the users such that they do not feel totally inadequate or in the dark as to system performance, but also as a source of target processing control, when appropriate. It may be seen, then, that while various radar processing system components have been available, a totally, integrated, automated system which gives a high level of performance has not heretofore been available.

SUMMARY OF THE INVENTION

The present invention provides apparatus which gives a high level of system performance in terms of true target detection, classification and tracking; i.e., complete radar data processing. In order to provide such apparatus, the invention is based upon a clear understanding of the physical properties of the radar environment and the effect of this environment on radar signals. Moreover, the invention combines the use of accurate search radar track data obtained by machine processing of radar video signals with the flexibility of a general purpose data processor, to provide an expanded capability for the radar operator involved in command and decision making. When fully implemented, the system provided by the invention is functionally interposed between the radar and the users to relieve the operators of routine manual detection, classification and tracking operations. The invention optimizes the target video, automatically detects, classifies and tracks targets, and provides target data to the users. Operator efforts are then directed toward the monitoring and supervision of the automated operations. The capability to control the system of the present invention is provided by a single console for use by command and control personnel. It is intended that to utilize the present invention the only modifications necessary to the existing radar installation will be to provide the appropriate search radar outputs and power inputs to the various subassemblies of the present invention. In short, the proposed system of the present invention is thus a sophisticated processing system designed to greatly enhance the utility of radar in larger systems such as, for example, in missile fire control and in air traffic control.

More specifically, the system of the present invention comprises signal processing circuitry formed chiefly of an adaptive video processor, programmed general purpose digital data processing or computer apparatus, interface electronics, and display and control electronics. Multiple modes of operation are permitted in the present invention. In one mode, for example, radar video and coordinates derived from a three-dimensional radar are processed by the signal processor circuitry; are digitized by a data converter; and, then fed into the programmed digital data processor. Target detection in the data processor or computer is performed by a series of logical correlations of sequential radar returns. There, a target becomes categorized as a track when the radar returns pass such logical test criteria, with every target in track being updated once every azimuth scan of the radar. It should also be noted that the signal processing circuitry is interactive with the programmed computer; e.g., the specific signal processing techniques applied to any particular target by the adaptive video processor is dependent upon the track status for that target as derived at the computer. Thus, it is contemplated in accordance with the present invention that the radar inputs be gated at predicted coordinates of target tracks, with controlled thresholds, in order to enhance track continuity and detection of marginal tracks. Moreover, tracks corresponding to stationary clutter may be used to inhibit detection in regions of heavy point clutter, without interfering with track continuity.

In an alternative mode of the proposed system, radar video and coordinates from two-dimensional radar may be processed, e.g., simultaneously with the three-dimensional radar inputs, to the adaptive video processor apparatus in a manner not unlike the three-dimensional mode, but with the height information excluded. This processed video is then digitized by the data converter and fed into the digital data processor for correlation in the same manner as in the three-dimensional mode.

In each operational mode, the data processor output is fed to a display controller unit for ultimate distribution to control and display consoles for use by the system operators. A large-screen monitor is available for use by the operator, and this can operate in two modes. A normal PPI mode provides the operator with either normal targets or processed video, as well as certain selected symbols. In this PPI mode, the operator is provided with an array of pushbuttons and a track ball for individual target call-up and control. The second mode provides a scan history display over several scans of the radar to aid the operator in severe clutter environment. Symbols and pushbutton controls are also provided for the operator in this mode. The availability of digital data on all targets seen by the radar(s) permits great flexibility in displaying information to the user. The optimum display (or sets of displays) will of course depend upon the system and the manner in which it is used.

The adaptive video processor included in the over-all signal processing circuitry of the present invention functions by deriving a threshold from the noise level in the immediate vicinity of the target and passing only those signals which are a predetermined amount above the local noise level. Signal extent or spatial size, as well as beam-to-beam signal correlation between scans, is also taken into account. As a result, the adaptive video processor thus acts to maintain target detectability at a constant false alarm rate in the presence of clutter, as well as in the presence of electronic countermeasures. In one embodiment, for example, this is accomplished by establishing a signal threshold level which is derived by measuring the average value of the input video in eighteen independent range and elevation cells adjacent to a target cell. The average value of these video samples form a basis upon which to compute the optimum threshold level for a given false alarm rate. In this way, data in the eighteen range and elevation cells causes the video threshold level to vary continually to maintain an optimum detection threshold and acceptable false alarm rate as the radar antenna scans in azimuth and elevation. The processed video and radar coordinates are then converted to digital data in the data converter and fed to the programmed general purpose digital data processor or computer.

The data processor, upon receipt of the data, begins by processing the incoming digitized processed video and the various associated triggers and radar coordinates. At the beginning, each signal derived from a radar echo is classified as a hit. The data processor then establishes the level of correlation of these hits with existing tracks and internal parameters, and classes each hit in one of three possible categories. Hits which are not correlated with existing tracks are classified as tentative tracks until sufficient data is obtained to determine whether that hit is caused by an air target, or a false alarm or clutter. Tentative tracks which are subsequently determined to be true targets are then promoted to the firm track category. Tentative tracks which are determined to be very slow moving or stationary are subsequently classified as stationary tracks.

The data processor is connected to and communicates with the other units of the system by way of input/output busses. These busses input and output information to and from the display controller which distributes information to the other display and control facilities in the operator console. As mentioned previously, by means of this console, the operator can control system operation, monitor overall system performance, and is provided with either a PPI display or a scan history of target hits. By way of example, in one practical embodiment of this invention light emitting diode readouts serve to provide an indication of the three categories of tracks, i.e., firm, stationary and tentative, and a lighted display is also provided to inform the operator of the hit activity in particular range, bearing, and elevation sectors. The operator then has the capability, by utilizing pushbuttons on the console, to select threshold levels and required data processor logic in twelve possible bearing sectors, four range sectors, and two elevation sectors.

In view of the foregoing summary, an object of the present invention is to provide a system to perform complete processing; i.e., detection, classification and tracking, of radar targets.

It is another object of the invention to provide an automated radar data processing apparatus which does not place the responsibility on an operator for initial detection and tracking, but which enables the operator to assume a system management position and thereby control data processing conditions to optimize target detection.

Another object of the invention is to provide a processing system designed to greatly enhance the utility of radar in larger systems such as military missile control and civilian air traffic control.

Another object of the present invention is to provide a radar data processing system which is compatible with most existing military and civilian radars, of either two or three-dimensional type.

A further object of the present invention is to provide a system capable of automated processing of radar targets; i.e., no operator intervention, but which is also designed to aid the operator in determining the threat potential of each target in a military system or potential air conflicts in an air traffic control system.

A still further object of the invention is to provide a radar data processing system including signal processing circuitry which is interactive with target track data such that the specific signal processing techniques applied to radar returns from a particular target are dependent upon the track status of that target.

Other objects, purposes and characteristic features of the present invention will in part be pointed out as the description of the invention progresses and in part be obvious from the accompanying drawings.

BRIEF DESCRIPTION OF THE DRAWINGS

FIG. 8 is a schematic diagram of a detection threshold circuit;

FIG. 19 is a block diagram of circuitry employed in one embodiment of the invention for generating and transferring gating signals which control the radar video input processing.

DETAILED DESCRIPTION OF THE PREFERRED EMBODIMENT

Figure 1:
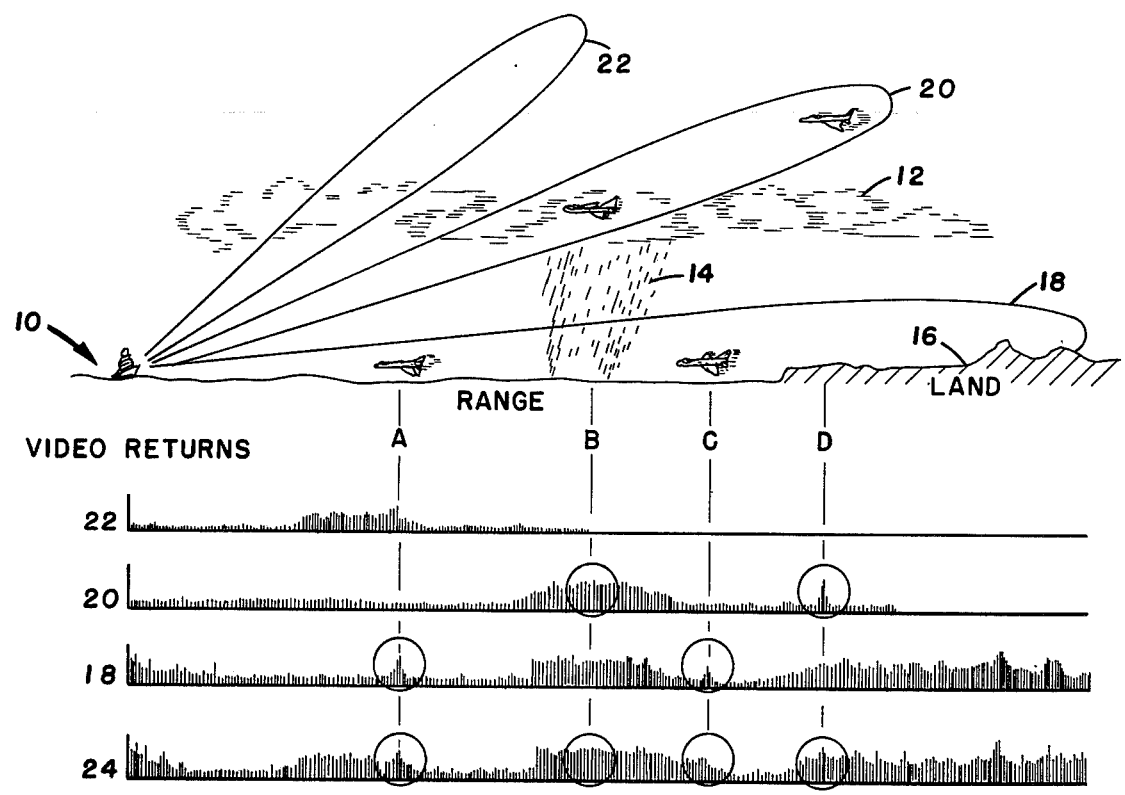
FIG. 1 is a diagrammatical view showing the performance of a three-dimensional radar in clutter.

The system constituting the present invention is functionally interposed between the search radar(s) and the user and optimizes the target video, automatically detects and tracks targets, and provides target data to the user in an efficient and easily readable manner. The efforts of the operators may, as a result, be directed to the monitoring and supervision of the operation of the automated equipment employed. The system is so designed that it may be simply and quickly integrated with existing ship or air traffic control systems, with the result that costly modifications to such systems are unnecessary.

The capability of controlling the system is provided by various display and control units which, when the system is used for surface ship air defense, may be located in remote areas of the ship, for use by command and control personnel. The only requirements of the ship are that it provide appropriate search radar outputs and power inputs to the units comprising the system.

Four major groups of equipment are used in the system of the invention. They are the converter group, the data processing group, the adapter group, and the control group.

The converter group provides the video converters required to receive, process and digitize incoming radar video, and report results to the data processing group. The data processing group comprises the computer and the peripheral units (tape and teletype units) therefor. The adapter group provides the interface electronics to designate targets to a fire control system and a data conversion unit which allows the computer to communicate with the control group. The control group provides all of the display and control units for the system.

In the three-dimensional (3-D) mode of operation, video and trigger pulses from the search radar are fed to the radar video converter of the converter group. The radar video converter is designed to maintain target detectability at a constant false alarm rate in the presence of clutter and electromagnetic countermeasures (ECM). This is accomplished by establishing a signal threshold level which is derived by measuring the average value of the input video in, for example, 18 independent range and elevation cells adjacent to a target cell. The average value of that video sample forms the basis for computing the threshold level that must be exceeded in order to establish a radar hit. Data in the 18 range and elevation cells continually vary the video threshold level to maintain a constant and acceptable false alarm rate as the radar antenna scans in azimuth and elevation. The processed video and radar coordinates are digitized by the converter and fed to the computer of the data processing group.

The computer is a general purpose data processor such as the Honeywell DDP-516(R). In a typical embodiment, the computer contains a 16,384 word by 16-bit core memory for program and data storage. The program for the computer uses the digitized radar triggers, coordinates, and processed video to calculate hit centroids of targets present in the video signal. These hit centroid positions are then compared with existing tracks in the system. Those hit centroids that correlate with existing tracks are used to update the positions and velocities of said tracks. Hit centroids that do not correlate with existing tracks are entered as Tentative tracks. A track remains Tentative until enough data is obtained from subsequent azimuth scans of the radar antenna to determine whether it resulted from a real target, a false alarm, or clutter. False alarms that do not receive further correlations are dropped. Clutter points that are either slow moving or stationary are promoted to Stationary Tracks. True moving targets are promoted to Firm Tracks. The computer has the capability of storing position and velocity data on 256 Tentative and Firm tracks, and position data on an additional 256 Stationary tracks.

The tape and teletype units of the data processing group act as standard peripheral units for the computer. The tape unit has two functions, i.e., to read programs into the computer, and to provide a medium for dumping program track activity data for further evaluation of performance and efficiency of the total system operation. The teletype unit is used primarily during system testing where certain codes are entered into the computer to provide a certain test function. It may also be used for limited tactical program changes.

The computer communicates with the remainder of the system by way of the display and control converter of the adapter group. The display and control converter conducts data to and from the computer and conducts data to and from the weapons control converter for direct designation purposes. The display and control converter also contains an azimuth converter which receives digitized 3-D coordinates and converts them to analog for use in the track data indicator which is included in the adapter group.

The display and control units of the system, in addition to the track data indicator, include a radar processing control unit, track data control, a radar repeater interface, a track status indicator and a track status control unit.

The radar processing control unit establishes the overall performance of the system. Light emitting diode readouts provide numeric indications for the three categories of tracks of the system, i.e., Tentative, Firm and Stationary, held in the computer. Also shown in the computer is the total number of hits processed by a radar video converter during each azimuth scan. A light display informs the operator whenever a particular range, bearing, and elevation sector becomes saturated with ungated hits, and an operator may select threshold levels and required computer logic in 12 possible bearing sectors, four range sectors and two elevation sectors.

The track data indicator and the track control indicator are located in the same console, and two types of displays are available to the operator at this console. The standard PPI display provides either raw video (2-D or 3-D) or system-processed video (2-D or 3-D). The Scan History Display (SHD) provides the capability of displaying sequentially a history of search radar hits up to eight scans, starting with a "least recent" hit and ending with a "most recent" hit. By observing the moving sequence patterns thus produced, the operator can easily monitor the most recent maneuver of a particular target.

In addition to the PPI and Scan History Displays, system track symbols generated by the track data indicator electronics are available for display to the operator. The displayed symbols are selected by the computer and aid the operator in observing the status of system tracks on the indicator screen. The operator can communicate with the computer through the track data control panel and can augment the system as follows:

1. He can look for targets that the system has not detected and provide manual position track updates using the track data control.
2. He can change the status of targets that the computer has not recognized.
3. He can assist system tracks which are intersecting or are experiencing high-speed maneuvers.

The radar repeater interface consists of a symbol generator and a control panel. Thus unit provides symbols for the system and control of the symbols to be displayed on a ship's SPA repeater. The unit provides essentially the same display and control capability of system tracks as does the track data control. The only difference is that the symbols are displayed on an existing shipboard repeater.

The track status indicator provides an alphanumeric TV readout for a visual indicator of overall system performance. As operational tactical considerations direct, the track status indicator reads out target data in sectors of special interest on threats that meet preselected criteria and are designated system tracks. There are six different groups of data that can be displayed on the track status indicator.

The track status control unit provides the capability of selecting data readouts on the top eight threats within a selectable range, bearing, elevation, speed and approach angle sector. Additionally, direct designation may be made by way of this unit. One unit is capable of operating in four separate modes, and one additional mode may be selected to display six different groups of data on the track status indicator.

In the 2-D mode of operation of the system, radar video and trigger pulses are fed to a 2-D radar video converter which processes the video in the same manner as the 3-D radar video converter, except for height data. The processed video and trigger pulses are then fed to the video converter to be digitized and fed to the computer. Additionally, the synchro coordinate data from the 2-D radar is fed to the display and control converter where it is digitized and fed to the data converter section of the 3-D radar video converter, for transfer to the computer. The synchro coordinate from the 2-D radar is also converted, in the display and control converter, to provide sweep data for display on the track data indicator. After target data is fed into the computer, the processing, display and control functions are essentially the same as those in 3-D system operation.

Referring now to the drawings, the performance of a typical three dimensional shipboard radar operating in a normal environment is shown in FIG. 1. Four air targets are shown at radar range positions A, B, C, and D. The normal operating environment is characterized by sea clutter represented generally at 10, a layer of clouds 12, localized rain 14 at range B, and land mass profile 16 at range D and beyond. Only three beam groups 18, 20, 22 are shown as being representative of the total elevation scan of the radar. The radar traces produced by each beam group are shown and are identified by the corresponding beam group number 18, 20 and 22, with each trace representing the amplitude of the returned radar signal as a function of range. Beam group 22, for example, shows the cloud layer at 12 with no targets being present, and beam group 20 also shows noise caused by the cloud layer 12 which masks a target at range B, but does not mask a target at range D. Beam group 18 produces a trace showing sea clutter, a target at A, noise caused by the rain 14, a target at range C, and noise caused by the land mass at range D and beyond. A collapsed radar video trace is shown at 24 in FIG. 1, which is what a conventional radar would display on a PPI screen. As may be seen, even though three out of four targets would have been detected if each individual beam group was displayed, when the video is collapsed and displayed on a conventional PPI display only one target, at range A, will likely produce a signal greater than the collapsed noise produced by the environment. As will be explained in detail hereinafter, the video converter apparatus provided by the system of the present invention serves to eliminate this problem of targets being masked by collapsed environmental noise, by deriving the threshold value from the specific noise level in the immediate vicinity of each target. The converter then passes only those return signals which exceed the local noise levels by a predetermined amount, e.g., by 15 db.

Figure 2:
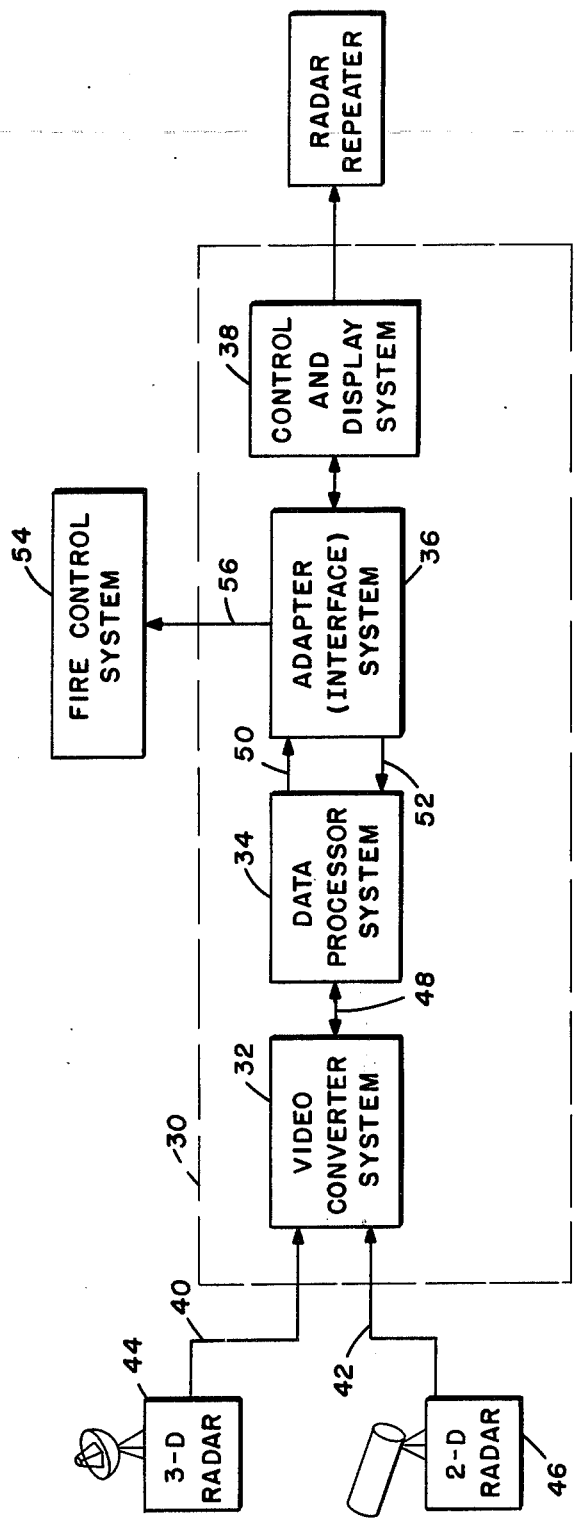
FIG. 2 is a simplified block diagram of the invention.

Referring to FIG. 2, one embodiment of the proposed radar data processing system is shown in block diagram form. Inside the dashed line 30 are the major subsystems of the present system, namely, a video converter system 32, a data processor system 34, an adapter or interface system 36, and a control and display system 38. The video converter system 32 serves to receive, process and digitize incoming radar video signals on lines 40 and 42. These radar video input signals are assumed to be provided by a conventional three-dimensional search radar 44 and a conventional two-dimensional radar 46. The video converter system 32 then feeds the radar data, via line 48, to the data processor system 34 which is comprised of a programmed general purpose digital computer and its associated peripheral units. The adapter system 36 is connected to the data processor system 34 by lines 50 and 52 and performs the interface functions necessary to allow the data processor system 34 to designate targets to a fire control system 54, over line 56, as well as to control and be responsive to the control and display subsystem 38.

Figure 3:
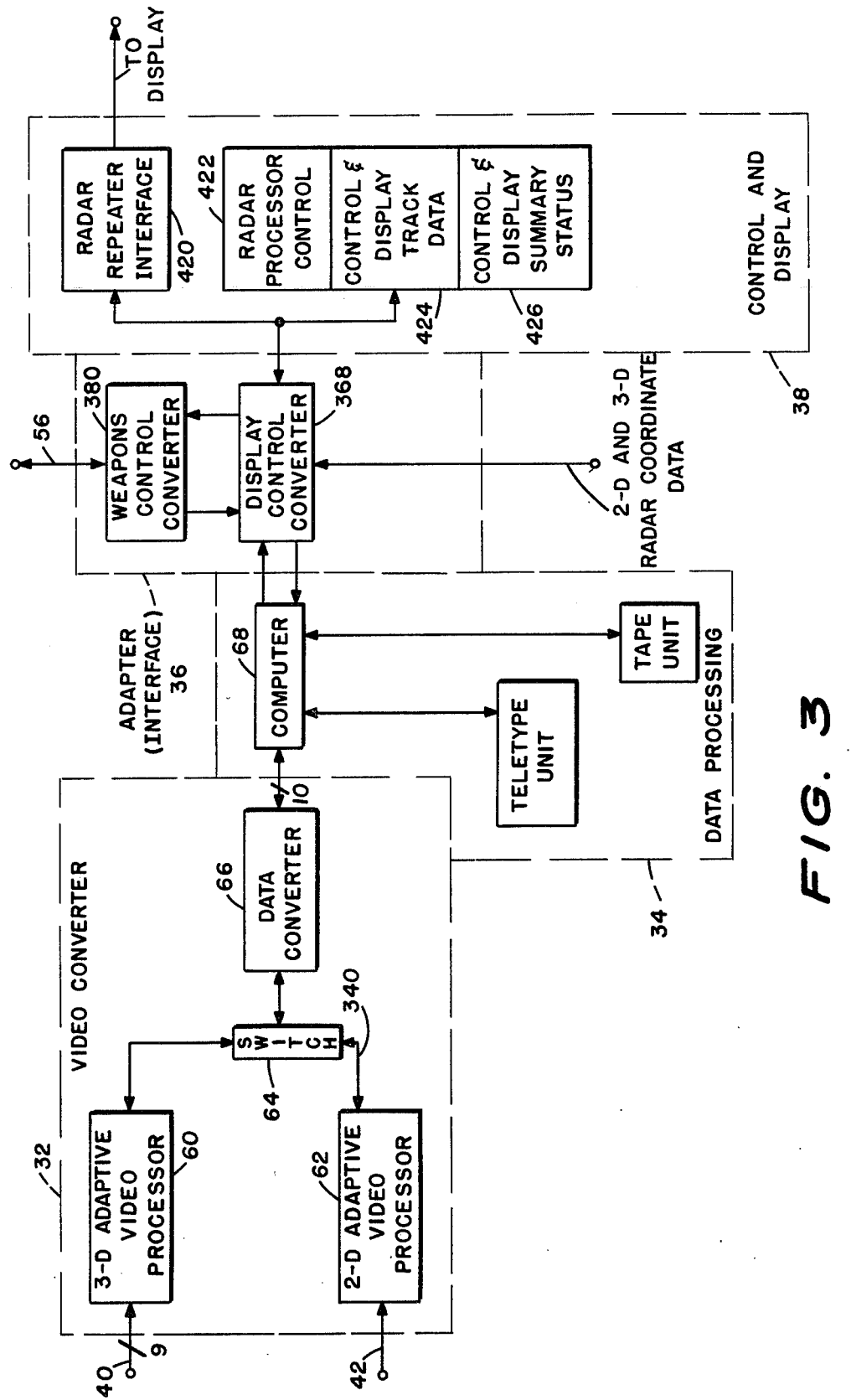
FIG. 3 is a block diagram showing the invention in more detail.

Reference is now made to FIG. 3 of the drawings which shows the arrangement of the system in a somewhat more detailed block diagram. As stated hereinabove, the system comprises four major groups of equipment, i.e., video converter subsystem 32, data processing subsystem 34, adapter or interface subsystem 36, and control and display subsystem 38.

The video converter 32 includes a three-dimensional (3-D) adaptive video processor 60, a 2-D adaptive video processor 62, a switch 64 for switching from 3-D to 2-D processing or vice-versa, and a data converter 66.

In this illustrated embodiment, the 3-D adaptive video processor 60 provides automatic detection of target-like returns on the illustrated nine lines of height video represented at 40 from the 3-D radar 44 (see FIG. 2). These nine lines correspond to the nine beam groups produced by the 3-D radar. A synthetic (processed) video pulse is generated for each target detection and this processed video is made then avialable for display on a master control console, as will be described hereinafter. More specifically, the adaptive video processor 60 automatically determines the elevation of a detected target within a beam group and the amplitude of the target signal relative to its immediate environment. The elevation, relative amplitude and range are digitized and routed, by switch 64, to the computer 68 through the data converter 66.

The video processor 60 provides a low, constant false alarm rate which is based upon a normal statistical distribution of noise, insensitivity to most types of distributed clutter encountered by the radar, and near optimum target detection sensitivity. This combination of optimum detection sensitivity and a low, constant false alarm rate effectively eliminates the effect of elevation collapse of noise and clutter normally associated with 3-D search radar PPI displays (see trace 24 in FIG. 1).

To determine a near optimum threshold level for noise and most types of clutter it is only necessary to measure the average amplitude of the clutter. The adaptive video processor 60 of the video converter subsystem of the present invention determines this threshold by summing and averaging independent samples of video in the near vicinity of each radar range resolution cell of interest (3 $\mu$ sec. is a typical effective pulse width for the 3-D radar 44). These samples are taken, for example, from three range cells on either side of the resolution cell under investigation on three adjacent elevation beams. Using this threshold, a signal-to-threshold signal is generated for each elevation beam by comparing the threshold voltage to the radar video signal in each cell of the three adjacent elevation beams. For each radar beam, four threshold voltages are continuously produced by sampling the video from four groups of three beams each. For example, an adaptive threshold voltage $VT_1$ is derived from six resolution cell samples in beams 1, 2 and 3; adaptive threshold voltage $VT_2$ from sample cells in beams 3, 4 and 5, etc. The signal-to-threshold levels in a three beam triad are then compared to a second (detection) threshold and a target is declared present in a triad if the result exceeds a predetermined value.

The detection threshold is automatically controlled in magnitude, in a closed loop circuit, by making it proportional to the number of detection threshold crossings for three adjacent elevation beams. The magnitude that the radar signal must reach to be declared a target is dependent upon the false alarm rate that has been set; that is, increasing the false alarm rate also increases the target sensitivity. As will be discussed in detail hereinafter, the adaptive video processor of the illustrated embodiment has four thresholds: one produces processed video with a probability of false alarm (pfa) of approximately $10^{-6}$, one produces the processed video with a pfa of $10^{-3}$, and the other two produce processed video utilizing threshold levels which are ± 3 db from that threshold level which produces the $10^{-6}$ pfa. The selection of the probability of false alarm (pfa) parameter is under the control of the system operator by means of a radar processing control unit contained in the control and display subsystem 38 (see FIG. 3) and to be described hereinafter.

As will be discussed in more detail later, the proposed system contains a requirement that a target detection occur at the same range in at least two adjacent beams. This allows the lowering of the detection threshold, thus increasing target sensitivity. Since, on the other hand, the false alarms are not correlated, a probability of false alarm (pfa) of $10^{-3}$ at the input to a logical AND gate circuit which decides if detection occurs at the same range will produce a $10^{-6}$ pfa video at the output. Another advantage of this correlation technique is the elimination of radio frequency interference (RFI) from other transmitters in the vicinity.

As a result of the range resolution cell averaging technique used in the illustrated embodiment, the processed video output is delayed slightly; e.g., by approximately 22.5 microseconds, relative to the raw video. If this video error were applied to a PPI or RHI which used the normal radar display triggers, a range error would exist. To prevent this problem, the appropriate radar triggers are also delayed and regenerated or occur at the correct time with respect to the processed video output. Moreover, and as will be described, in one special mode of operation of the 3-D radar, the tapped delay line method of signal processing employed normally is not used, although an adaptive threshold feature to limit the false alarms on extended clutter is employed. When the radar 44 is in such special mode, the video return is present on only one of the nine height-video input lines, and a signal from the radar controls the video processor to operate in such a manner that the video is amplified and level shifted and then compared to a threshold which is automatically adjusted by a closed control loop circuit, to produce fifty percent threshold crossings.

Figure 4:
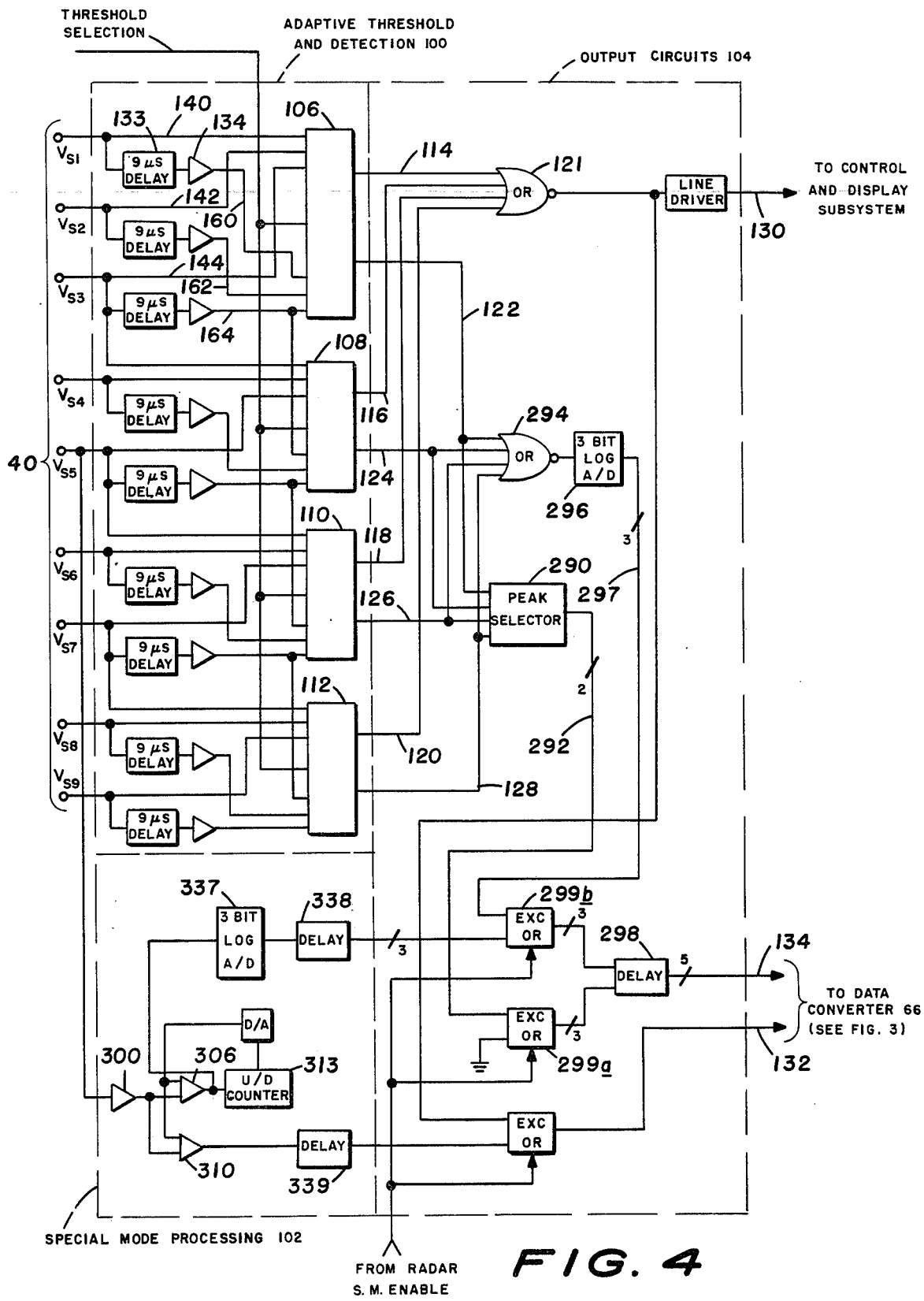
FIG. 4 is a block diagram of the adaptive video processor of the invention.

A more complete understanding of the proposed adaptive video processor 60 contained in the video converter subsystem may be had by reference to the detailed block diagram shown in FIG. 4 of the drawings. More particularly, the typical adaptive video processor consists of the three distinct sections enclosed in dashed lines and labelled adaptive threshold and detection 100, special mode processing 102, and output circuits 104. Comprising the adaptive threshold and detection portion of the illustrated processor are four identical circuits represented at blocks 106, 108, 110, and 112, each of which services three (a triad) of the nine input height-video lines from the 3-D radar during normal operations. When the 3-D radar is operating in the special mode previously mentioned, detection and thresholding operations are performed by special mode circuits, shown generally at 102 in FIG. 4.

The output data circuits, shown generally at 104, logically OR the synthetic (processed) video and the detected signals on lines 114, 116, 118 and 120 together, at gate 121, as well as the signal-to-threshold ratio outputs on lines 122, 124, 126 and 128, to generate combined synthetic video on lines 130 and 132 and quantized peak signal amplitude and beam elevation outputs on line 134.

The nine lines of range height-video on input lines 40 are initially processed undelayed, in overlapping groups of three, to develop an adaptive threshold voltage for each of the four triad circuits 106, 108, 110, and 112 in the video processor. Delayed video to the triad circuits, produced by inputting the video signals through a $9\mu$ second delay circuit 133 and buffer 134 is then used for comparison to the adaptive threshold in order to produce the signal-to-threshold ratio ($V_s/V_t$) signal, e.g., on line 122.

Figure 5:
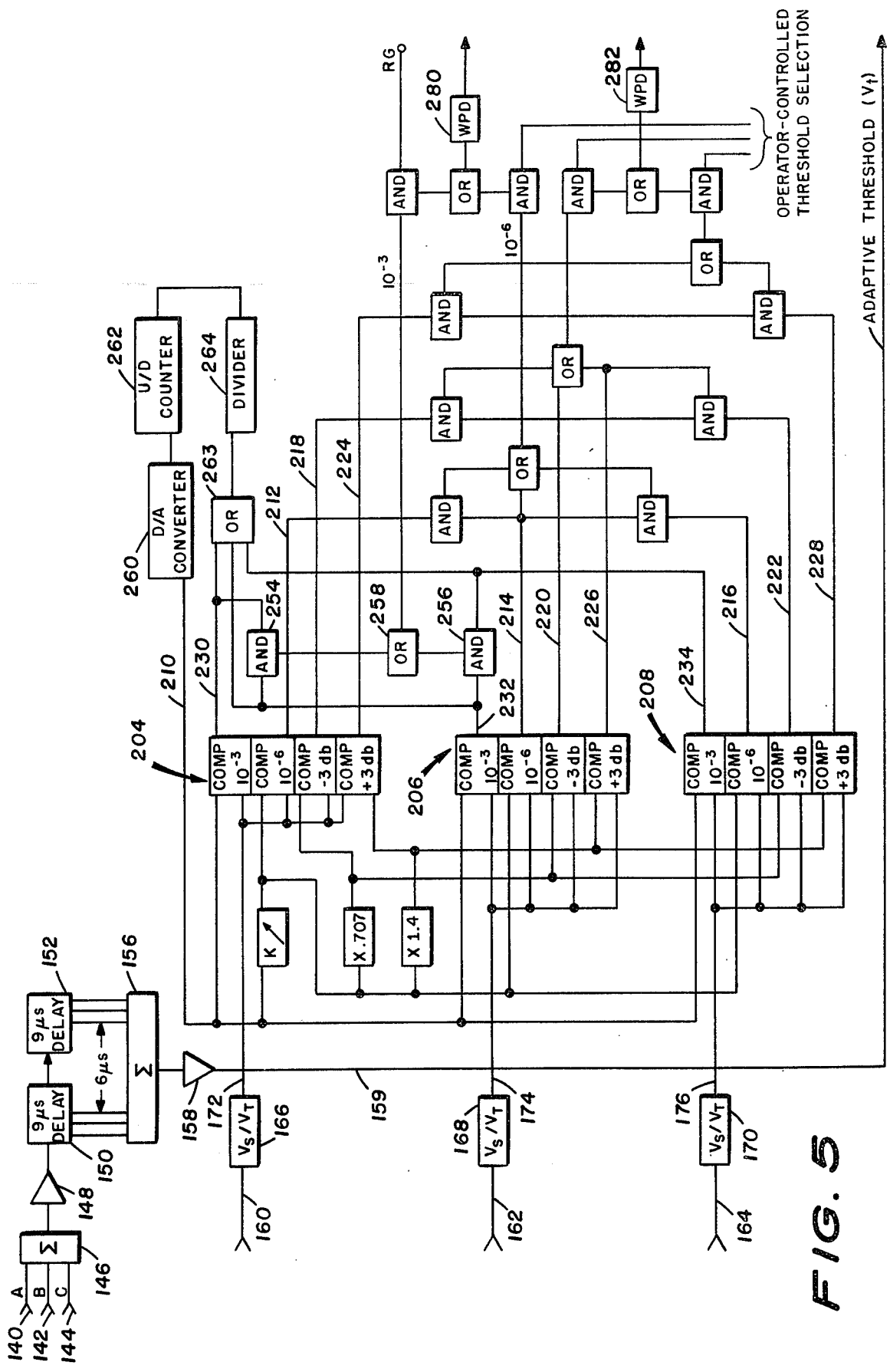
FIG. 5 is a block diagram of a triad utilized by the adaptive video processor of the invention.

Specifically, in a typical triad, shown in FIG. 5, the undelayed video signals from three of the input lines 140, 142 and 144 are summed at 146 and fed, via inverting amplifier 148, to a tapped delay line which is formed by two identical $9\mu$ sec. delay sections 150 and 152, each having nine taps spaced at $1\mu$ second delay intervals. The output of the first five taps on the first delay line section 150 and the last five taps on the second delay line section 152 are summed at 156 and scaled by an operational amplifier 158 to form an adaptive threshold voltage level on line 159.

As noted earlier, the adaptive threshold and the delayed video on lines 160, 162 and 164 are used to form a signal-to-threshold ratio signal. Thus the adaptive threshold generated for each triad is compared to each of the three delayed video signals 160, 162 and 164, associated with the triad. One of the signal-to-threshold ($V_s/V_t$) ratio signal forming circuits is shown in detail in FIG. 6. Three identical circuits 166, 168 and 170 are used in each triad to form the three $V_s/V_t$ ratio signals on lines 172, 174 and 176 respectively. Since there are four triads in the complete adaptive video processor, twelve such circuits are needed to generate the required number of signal-to-threshold ($V_s/V_t$) ratio signals.

Figure 6:
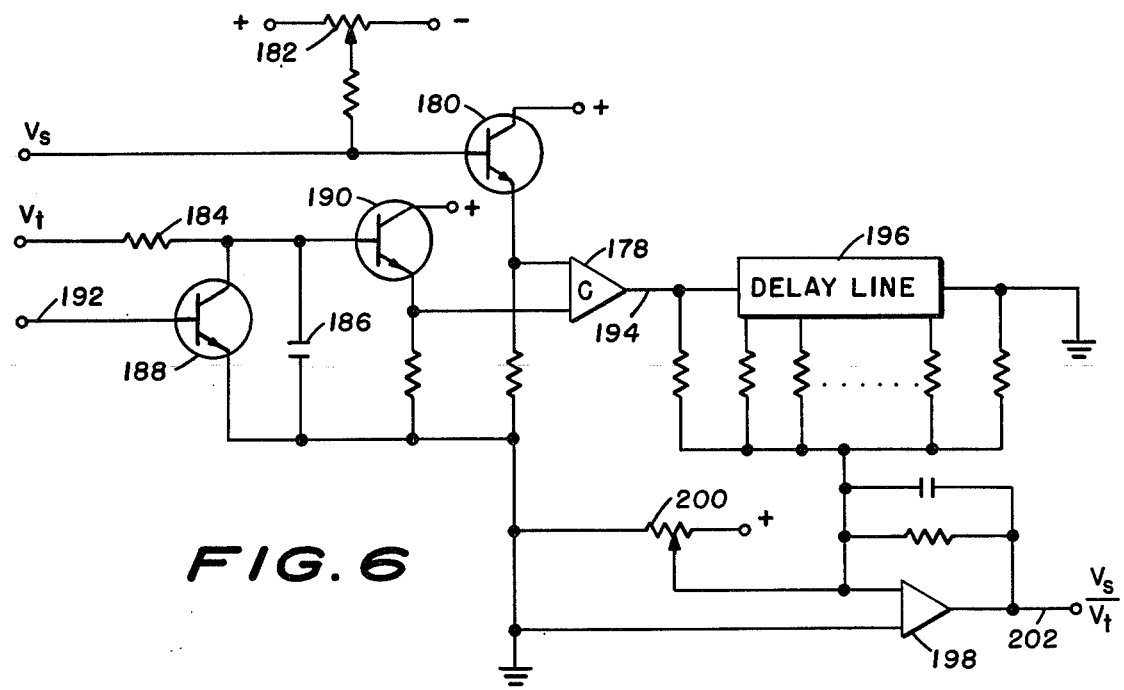
FIG. 6 is a schematic diagram of a signal-to-threshold video signal forming circuit.

More specifically, as illustrated in FIG. 6, ratio $V_s/V_t$ is generated by the combined use of a dumped integrator, voltage comparator and a matched filter. The video signal voltage $V_s$ (e.g., from line 160 in FIG. 5) is fed to a comparator 178, through an emitter follower 180, after being properly level shifted by a variable resistor 182. The adaptive threshold voltage $V_t$ (line 159, for example) is fed to the dumped integrator which is formed by resistor 184, capacitor 186 and transistor 188. The dump transistor 188 shorts the integrated adaptive threshold voltage ($V_t$) to ground for approximately 100 nanoseconds whenever a phase 2 clock is present on line 192. From the integrator the $V_t$ voltage is fed to the voltage comparator 178 through an emitter follower 190. The sequence of operation is as follows: When the video signal ($V_s$) is greater than the integrated threshold ($V_t$), the voltage comparator output on line 194 is high; whereas, when the threshold ($V_t$) exceeds the signal ($V_s$), the comparator output on line 194 is low. Since the integrator is dumped to ground every $1.5\mu$ seconds by the phase 2 clock on line 192, the comparator output goes high during the dump period. When the dump pulse is removed, $V_t$ integrates linearly until the next dump pulse. Thus, the output of the comparator on line 194 is a series of pulses whose widths are proportional to the ratio $V_s/V_t$. These pulses are then fed through a conventional tapped delay line type matched filter comprised of delay line 196 and operational amplifier 198. A variable resistor 200 allows the output ratio signal $V_s/V_t$ on line 202 of the amplifier 198 to be referenced to the proper value.

Referring once again to FIG. 5, the three such signal-to-threshold ($V_s/V_t$) ratio outputs on lines 172, 174 and 176 derived for each triad, are compared in comparators 204, 206 and 208 with a detection threshold on line 210 and combined to form: (a) a normal synthetic video output on lines 212, 214 and 216; (b) a more sensitive synthetic video output on lines 218, 220 and 222; (c) a less sensitive synthetic video output on lines 224, 226 and 228; and, (d) a threshold control output on lines 230, 232 and 234.

Figure 7:
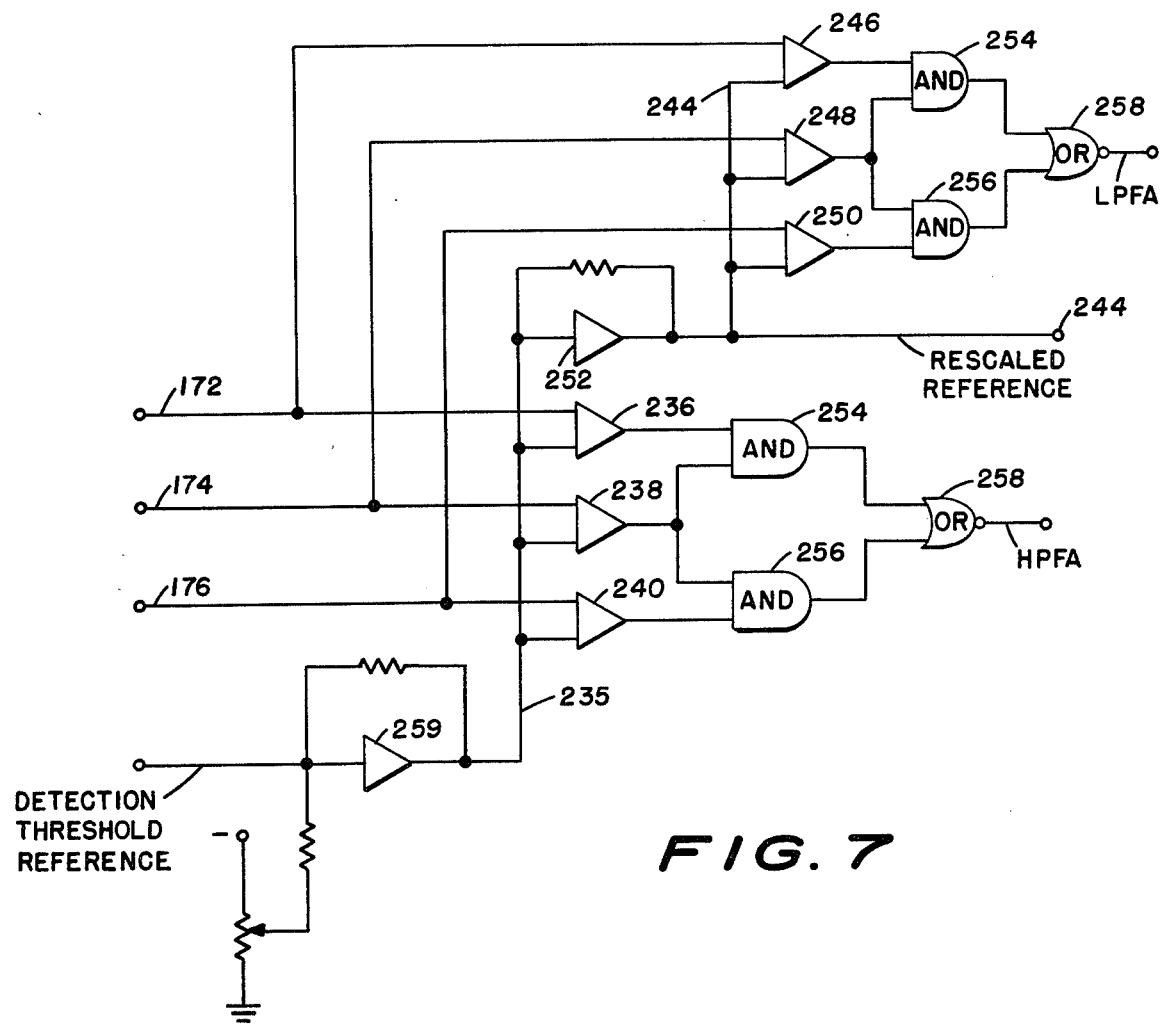
FIG. 7 is a schematic diagram of a synthetic video and threshold control pulse generator circuit.

The generation of these synthetic video and the threshold control pulses is accomplished by the circuitry shown typically in FIG. 7, one such circuit for each triad (four for the complete processor) being required. More specifically, the three $V_s/V_t$ ratio signals 172, 174 and 176 are each compared to a predetermined detection threshold level on line 235, in voltage comparators 236, 238 amnd 240 to generate high probability of false alarms (HPFA) outputs. To generate the low probability of false alarm (LPFA) outputs, the same three $V_s/V_t$ ratio signals are compared to a second detection threshold on line 244 in voltage comparators 246, 248 and 250. This second detection threshold is derived by scaling the detection threshold, line 235, in an operational amplifier 252 which has a gain variable from 1 to 10. At each comparator, when the magnitude of the $V_s/V_t$ ratio signal exceeds the magnitude of the associated detection threshold level, the output of the comparator goes high but is low otherwise. Beam-to-beam correlation is implemented, for example, by ANDing in logic elements 254 and 256 the comparator outputs for adjacent beams, and ORing the result in logic element 258. As shown, this correlation procedure is implemented on both the LPFA and HPFA comparator sets 246, 248 and 250, and 236, 238 and 240 respectively. As will be described, means is provided for digitally selecting either the LPFA or the HPFA synthetic video for processing. Thus, selection of the particular synthetic or processed video to be outputted by the adaptive video processor circuitry (FIG. 5 for example), is determined by threshold select signals, only one of which will be active at any one time and which are selected by the operator in accordance with radar range and bearing of interest.

The $10^{-6}$ detection threshold level, developed on line 244 in FIG. 7 for example by operational amplifier 252, is rescaled to develop one threshold which is 3 db greater and one that is 3 db less than the $10^{-6}$ detection threshold. Thus, the minus 3 db detection threshold could be generated by applying the $10^{-6}$ threshold to the operational amplifier 259 and properly adjusting its gain to 0.707 REF. Amplifier 252 would then double the 0.707 REF detection threshold to form the $+$ 3 db detection threshold at 1.4 REF. As discussed above, beam-to-beam correlation is implemented for both the $+$ 3 db and the $-$ 3 db synthetic video signal generating circuits.

The detection threshold, as stated hereinabove, is made proportional (by a closed loop circuit) to the number of times that the ratio $V_s/V_t$ exceeds the detection threshold for three adjacent elevation beams, for example. One embodiment of this detection threshold control circuitry is shown in FIG. 8; one such circuit being required for each triad and four for the complete adaptive video processor. More specifically, as shown in FIG. 5, the detection threshold reference voltage on line 210 is derived from a digital-to-analog converter network 260 which receives input from the seven most significant bits of a 10-bit up-down counter 262. The counter 262 (see FIG. 8) is made to count down one bit each time an $R_{max}$ trigger occurs (e.g., for the 3-D radar), and on the average it counts up one bit during the live time, from $R_o$ to $R_{max}$. The threshold control pulses, generated by ORing together the outputs of the $10^{-3}$ comparator group (lines 230, 232 and 234) are counted in a 4-bit binary divider 264 to form the count pulse to the up-down counter 262. For the subject processor, the divider 264 is operated as a divide-by-16 unit, as shown in FIG. 8. By dividing the threshold control pulses in this manner, the detection threshold is primarily controlled by the noise characteristics of the video and is not unduly affected by target detections.

As illustrated in FIG. 8, the up-down counter 262 comprises a divide-by-8 portion 270 which helps prevent changing the detection threshold on short-term radar interference signals and a 7-bit counter portion 272 which controls the D/A converter 260. As noted earlier, the counter 262 is rendered effective during each radar line time, as represented by the signal $R_o$ - $R_{max}$ on line 274, to count up on the average of 1 bit under the control of the divided-down threshold control pulses which are generated as described above; i.e., by comparing the three $V_s/V_t$ ratio signals to the existing detection threshold. Each delayed maximum range trigger $R_{md}$ is employed to control the counter 262 to count down 1 bit. The seven most significant bits of counter 262 control in a conventional manner the resistor ladder (see FIG. 8) forming the D/A converter 260 and produce an analog voltage level, on line 210, which functions as the detection threshold.

As shown in FIG. 5, each of the synthetic video signals generated for each triad is fed to a wide pulse discriminator circuit 280 or 282, prior to being outputted. Two wide pulse discriminator circuits 280 and 282 are required for each triad. This circuit inhibits all synthetic video which exceeds $6\mu$ sec. in duration and operates in the conventional manner. By way of example, in one practical application, the synthetic video is shifted through a register with a phase 2 clock and when the video spans at least 4 adjacent clock pulses, or $6\mu$ sec., a signal is generated that inhibits any extended video.

One of the functional requirements of the 3-D adaptive video processor 60 is to determine the elevation position of a detected target within a beam group. Referring once again to FIG. 5, it is shown that in order for a target to be detected, in any triad, it must be present in the center $V_s/V_t$ signal, line 174. The center $V_s/V_t$ signal from each triad (lines 122, 124, 126 and 128 in FIG. 4) are compared with each other in a peak selector 290. The triad with the largest signal is thereby selected and an associated 2-bit code becomes the two most significant bits of a 3-bit elevation word on line 292. The other two $V_s/V_t$ signals from each triad are compared to provide a 1-bit code indicating which is the largest and this then determines the least significant bit of the elevation word. Thus, the elevation of a detected target within a beam group is specified to 3-bit accuracy.

The amplitude of the target relative to the adaptive threshold for each detected target is furnished to the data processor subsystem 34 of FIG. 2. The center $V_s/V_t$ signal from each of the four triads is again used for this purpose. More specifically these four center $V_s/V_t$ signals are applied to an analog OR gate 294 which passes only the largest of the four $V_s/V_t$ signals at any given time to a Log A/D converter 296 where the largest $V_s/V_t$ signal is quantized into a 3-bit binary word with the least significant bit equal to 3 db. For this converter 296 the reference voltage employed in performing the A/D conversion is divided in logarithmic steps of 3 db to give the log characteristic. As is well-known, this type of converter uses $2^n - 1$ voltage comparators and, in this case, $n$ equals 3. The outputs of such voltage comparators may, if desired, be coded in a Gray code to minimize errors when the comparators may be changing state as they are sampled, and a standard Gray-to-binary decoder then employed to produce standard binary notation.

Since the peak selector 290, analog OR gate 294 and log A/D converter 296 operate on signals that are not delayed by the wide pulse discriminator circuitry (280 and 282 in FIG. 5), the elevation and amplitude output information is available, e.g., on lines 292 and 297 respectively, before the associated synthetic video is available, e.g., at the output of OR gate 121. In order to properly align these outputs, the elevation and amplitude bits are applied to a suitable delay circuit 298, via exclusive OR gates 299a and b respectively.

The clock and timing signals required to synchronize the operation of the adaptive video processor 60 (see FIG. 3) with the associated 3-D radar 44 are generated by appropriate and conventional circuits (not shown). For example, in the illustrated embodiment, trigger pulses are produced corresponding to the normal $R_o$, $R_{max}$ and $R_{19}$ pulses from the 3-D radar, along with the delayed triggers $R_{od}$ and $R_{md}$ previously discussed. A stable clock is also produced to provide pulses each one-eighth of a radar mile and closely synchronized to the triggers of the radar 44; e.g., by means of a crystal controlled oscillator whose time period when divided by 16 equals one-eighth of a radar mile is used. The output of such oscillator might then be divided by 16 in a binary counter which is reset to zero at $R_o$ and $R_{max}$, and the Q and $\overline{Q}$ outputs of the divide-by-16 counter are used to produce the phase 1 and phase 2 clock pulses. In this way, clock pulses are generated with a period equal to one-eighth of a radar mile and having a time jitter with respect to $R_o$ and $R_{max}$ of less than 100 nanoseconds. A second clock with a period of one quarter of a radar mile and an output of one-half the crystal oscillator frequency is also provided, as is a gate signal demarcating the radar live time from $R_o$ to $R_{max}$.

As stated hereinabove, when the 3-D radar 44 is operating in the special mode, utilizing the circuitry represented at 102 in FIG. 4, a wide pulse is transmitted and the return video appears on only one of the video input lines (e.g., line $V_{s5}$ in FIG. 4). Because of the width of the received pulse, it is not practical to use the same signal processing technique as employed in the normal mode. Rather, signal processing for the special mode is accomplished by the circuit shown in detail in FIG. 9. The input special mode video is properly amplified and level shifted through an operational amplifier 300. A variable resistor 302 controls the amplitude of the input and potentiometer 304 controls the reference level of the output of the amplifier 300, which is then fed to a voltage comparator 306 where it is compared to a threshold voltage (line 307) whose magnitude is automatically controlled by a closed loop circuit to cause the output of the comparator 306 to be high 50 percent of the time and low fifty percent of the time. For target detection the threshold voltage on line 307 is properly scaled in an operational amplifier 308 and used as the detection threshold at comparator 310 which also receives the special mode video output of amplifier 300. The magnitude of the scaling is controlled by a variable resistor 312. The automatic control of the threshold voltage for comparators 306 and 310 is accomplished by a 6-bit up-down counter (313 in FIG. 4) which is comprised of 2-bit binary adders 314, 316, and 318, and accumulator flip-flop pairs 320, 322 and 324.

Figure 9:
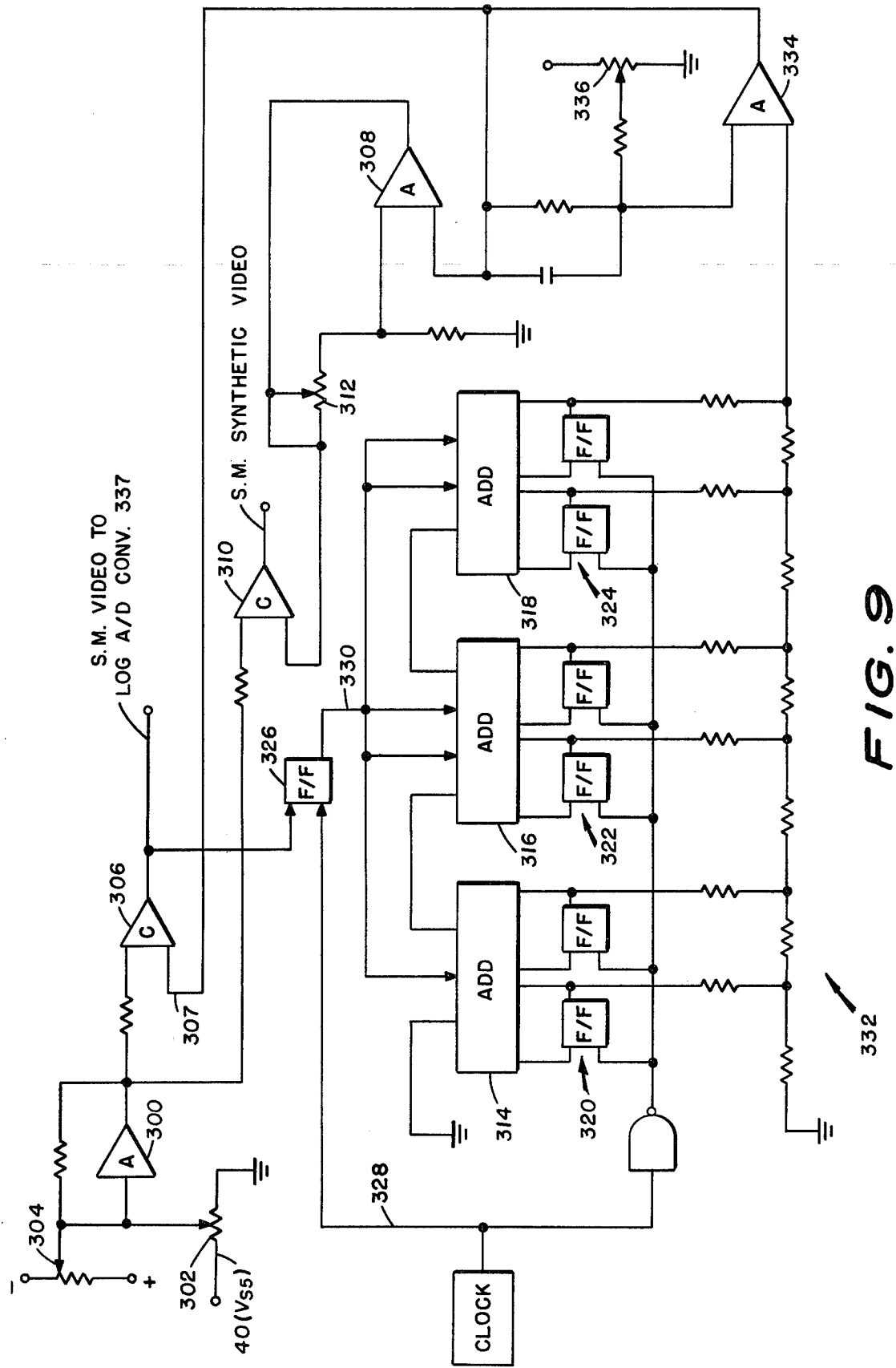
FIG. 9 is a schematic diagram of a special mode signal processing circuit.

The sequence of operation for the circuitry of FIG. 9 is as follows: The output of comparator 306 is clocked into a flip-flop 326, by a clock pulse on line 328 which occurs every 12 $\mu$ sec., and the $\overline{Q}$ output on line 330 is used as the up-down control of the 6-bit up-down counter. The counter also uses the opposite phase of the 12 $\mu$ sec. clock to count either up or down as determined by the $\overline{Q}$ output of the flip-flop 326. A resistor ladder network 332 is connected to the up-down counter and operates as a D/A converter to produce the analog threshold voltage which is then amplified and filtered by an operational amplifier 334. A variable resistor 336 is used to offset this voltage and insure that the up-down counter operates in the center of its dynamic range. The special mode video is also quantized by a 3-bit log A/D converter 337 (see FIG. 4) of the type previously discussed and the resulting amplitude bits, as well as the special mode synthetic video from comparator 310, are then properly delayed, at delay circuits 338 and 339, and gated to insure time alignment of the normal and special mode outputs. The delay circuits 338 and 339 can be formed, for example, by a series of shift registers using phase 1 clock pulses.

Figure 10:
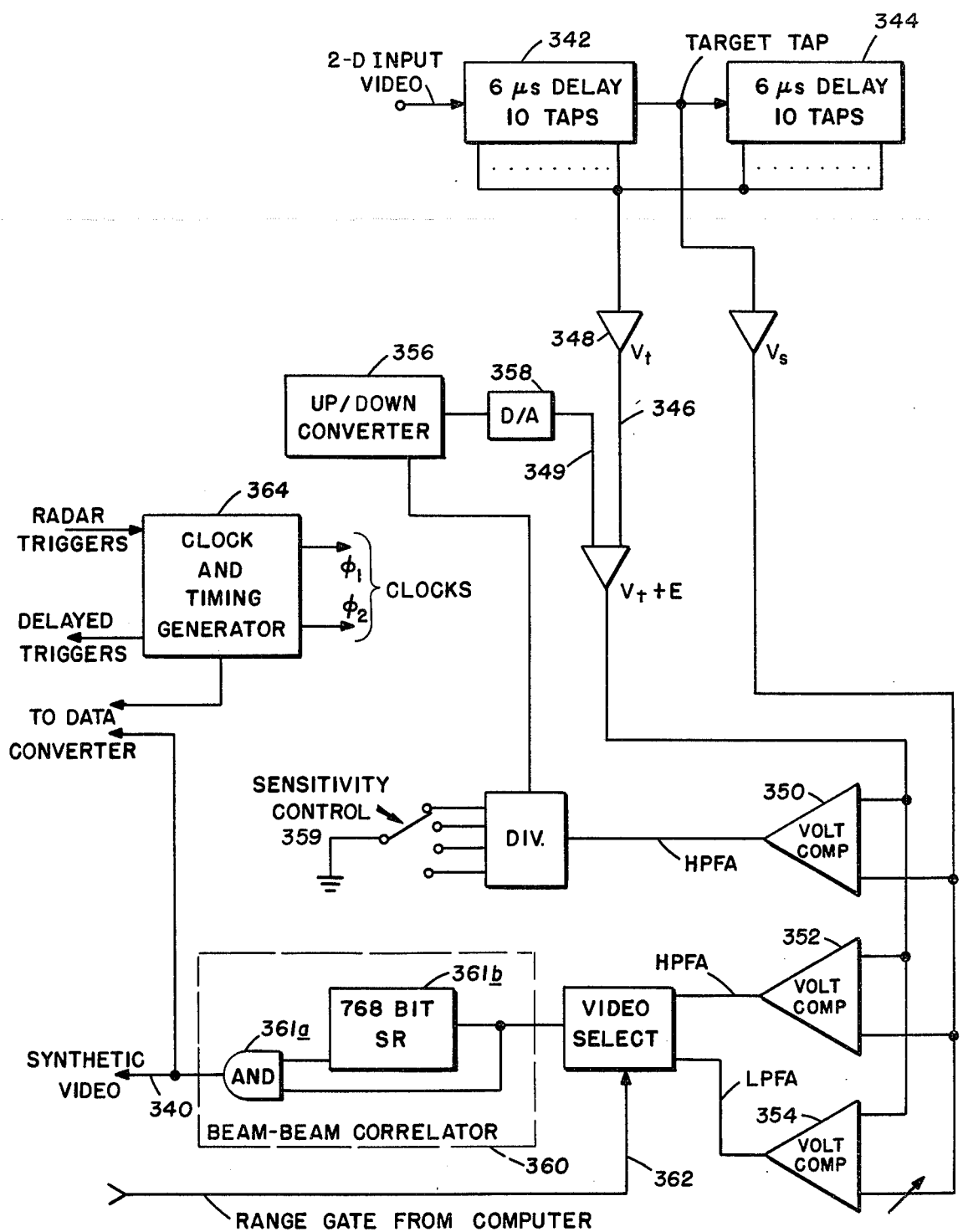
FIG. 10 is a block diagram showing an adaptive video processor for use with a two-dimensional radar.

The two-dimensional radar (2-D) adaptive video processor 62 of FIG. 3 is shown in a more detail functional block diagram at FIG. 10. The 2-D adaptive video processor accepts either normal or MTI/normal video signals and triggers on input lines 42 from the 2-D radar 46 and processes video, as will be described, to produce synthetic video on line 340 which has a low constant false alarm rate. The video processor 62 effectively eliminates distributed clutter and interference signals and reports only those radar returns that have a high probability of being targets.

More particularly, in the 2-D processor 62 the radar input video, either normal or MTI/normal, is fed to a delay line having two 6-microsecond delay sections 342 and 344 and an adaptive threshold voltage $V_t$ (on line 346) is formed by summing ten video range cells before and ten range cells after the target cell and then properly scaling the sum in amplifier 348. The threshold voltage $V_t$ is then added to a second, low threshold voltage (E) on line 349, and this sum is compared to the target cell video $V_s$, in voltage comparators 350, 352 and 354, to produce three different quantized video signals with different false alarm rates. As shown, one of these quantized video signals is used to generate the low threshold 349, by means of the up-down counter 356 and D/A converter 358 which function together as previously described to form a closed loop circuit, that automatically adjusts itself to produce the desired false alarm rate selected by sensitivity control 359. One or the other of the two other quantized video signals from comparators 352 and 354 are utilized, depending upon whether a range gate is being produced by the computer 68, to generate the final synthetic or processed video, on line 340, via beam-to-beam correlation circuit 360 formed by AND gate 361a and multiple bit shift register 361b. In other words, when no range gate is present on line 362, the LPFA video is selected and the output synthetic video will have a PFA of about $10^{-6}$; whereas, when a computer-generated range gate is present on line 362, the HPFA is selected and the output synthetic video will have a PFA of approximately $10^{-3}$. In FIG. 10 the block entitled clock and timing generator 364 represents the circuitry previously described which receives the radar trigger pulses and generates therefrom the needed delayed triggers, internal synchronizing signals and the phase 1 and 2 clocks.

Referring now back to FIG. 3, the 2-D processor 62 will thus process the input video in the same manner as the 3-D processor 60, except for the height data, and the resultant processed or synthetic video and triggers are input, e.g., via line 340, to the data converter 66 to be digitized and then fed to the computer 68. Additionally, the synchro coordinate data from the 2-D (along with coordinate data from the 3-D radar) radar is input to the display control converter 368 of the adapter group 36 (see FIG. 3) where the 2-D synchro data is digitized, as will be described, for transfer to the computer 68. The synchro coordinates from the 2-D radar are also converted in the display control converter 368, as will be described, to provide sweep data for display of the target track data.

The data converter, which is shown at 66 in FIG. 3, performs five main functions in the system of the present invention. Depending upon the position of the switch 64, the data converter receives either 2-D or 3-D radar digital beam position data and routes said data to the computer 68. It also receives radar triggers and 2-D or 3-D adaptive video processor detection target data, formats it as necessary and sends it to the computer 68. The data converter 66 also generates computer-controlled blanking gates, threshold gates, test targets and track or range gates. Operation and timing of the data converter 66 are controlled by output control pulses from the computer 68, and in one practical embodiment such control pulses were applied on a 10-bit address bus (6 bits for device address code and 4 bits for device instructions) with a control pulse to indicate when controls are present.

The data converter 66 includes conventional address bus line receivers and device decoders which respond to the address and device instruction codes received from the computer 68. By way of example, typical device instructions received and decoded by the converter 66 would include instructions to enable the various direct memory access (DMA) channels employed for communications between the computer 68 and the converter 66, instructions for setting and inhibiting range gate generation and, means to enable or inhibit, as desired, the various interrupts communicated between the converter 66 and the computer 68.

For example, the various radar triggers such as, for example, the 3-D radar elscan trigger, $R_{19}$, and the range max trigger, $R_{max}$ are input to the computer 68 as interrupt signals. Similarly, suitable other interrupts would be used by the data converter 66 as necessary to properly accomplish interface between the computer 68 and some other computer such as for example a Naval Tatical Data System (NTDS) computer, if present. As will be apparent to one skilled in the art, one purpose accomplished by the interrupt signals furnished to the computer 68 via the data converter 66 is to synchronize the operation of the computer with the radars; e.g., to insure that the functioning of the computer program within machine 68 begins at the start of the radar elscan for the 3-D radar.

More particularly, the digital elevation and aximuth beam position data are supplied to the data converter 66, from the display control converter 368 as will be described, in the form of two sets of 12 bit parallel digital words which are then input to the computer 68 as four 16-bit words during radar dead time, by means of a conventional direct memory access (DMA) channel. Target detection or hit information from the 3-D or 2-D video processors is also fed to the computer 68 over this same DMA channel. As will also be described in detail hereinafter, video input is inhibited in a controlled fashion by suitable gate signals (collectively referred to as range gates hereinafter) including computer-controlled blanking gates, test targets, operated-selected threshold gates and track gates, which are output from the computer 68 as a block transfer on a second direct memory access line (DMA2), during radar dead time.

A simplified block diagram of one possible embodiment for transferring the range gate signals from the computer 68 to the data converter 66 is illustrated in FIG. 19 of the drawings. By way of example, when the computer program has initialized the associated direct memory access channel (DMA2) for the range gate operation to output the desired number of words, an output control pulse is sent on line 370 to set the flip-flop 371 to generate a set signal on line 372 leading to the computer 68, so as to initiate outputting of the range gate words. As these words are being output, over the associated DMA output bus 373 and applied to the range gate driver 374, the word sequencer 375 counts the output strobe pulses to latch the range gate word into the appropriate buffer 376. When the desired number of words has been outputted, the computer 68 sends an end-of-range pulse which resets the flip-flop 371 and removes the enable from the line 372.

At range zero ($R_{od}$) the range gate words are transferred to the gate generators 377 and decoded as follows: (a) for blanking gates, the complement of the range to the leading edge of the desired blanking gate is preset into a range counter and the complement of the desired gate width is preset into a width counter of the selected blanking gate (BG) generator 377, and when the generator is subsequently enabled the range and width counters are incremented in sequence to produce an output range gate format divided into starting range and gate width segments; (b) for test targets, the complement of the leading edge range and desired range width are preset into the appropriate TG generator 377 which, when enabled, are subsequently incremented in sequence and outputted to the adaptive video processor; (c) for tracking gates, a selected one of the illustrated eight range gate generators 377 are enabled and produces a suitable range gate word (RG) which is sent to the adaptive video processor to increase the sensitivity during the selected range gate and also sent for appropriate display to the operator; whereas, the operator controlled TCP gates are generated similarly to the test targets and tracking gates and are utilized, as will be described hereinafter, to set the detection sensitivity at the adaptive video processor for any selected sector of interest within the radar field of view. As represented at block 378 in FIG. 19 means are provided for generating a manual blanking gate which begins at range $R_{od}$.

As noted earlier, a general purpose of the computer 68 is to process the encoded radar data received from converter 66, so that true air targets can be separated from stationary targets or false alarm radar hits. The resulting output of the computer 68 is tracking data representing the best estimate of true target positions and velocity. This information is made available for use in a weapons system to aid in manual target detection, combat electronics countermeasures, track detected targets, designate weapons to targets, and evaluate threats.

The computer 68, as previously described might be a Honeywell DDP-516(R) data processor which contains a central processor unit (CPU) including data multiplex control and normal programmed interface circuits, an adequate memory and suitable controls and power supplies. The central processor for this type machine is organized as a parallel binary, single address, general purpose unit. The normal input/output medium for such computer is through programmed input/output facilities, and a program instruction must be executed to effect a transfer of data between a peripheral device and the data processor. A feature of the input/output system of this type computer which is quite valuable in critical programs is that the computer can test for "I/O Busy" or "I/O Ready" as a part of either input or output instructions.

The data multiplexed control facilities within the CPU provide multiple (16) high-speed data-transfer paths between peripheral devices and the computer memory, transfers being controlled by the data multiplex control circuitry as is well-known. After set-up for transfers, the channels operate by using four memory cycles from the normal program sequence. Data is transferred through the M-register of the memory/CPU system and the common data bus. Starting and final addresses for block transfers are stored in suitable memory locations.

The computer 68 also contains a direct memory access facility priority interrupt system, controllers for a paper tape reader, a paper tape punch, an interface for the teletype unit, and a special interface for the magnetic tape unit. The direct memory access facilities provide means for block transfers between peripheral devices and memory similar to the direct multiplexed control facilities, the primary difference being that a transfer takes only one memory cycle, instructions need not be completed, starting and ending addresses are stored in hardware registers, special I/O lines are provided, and only four channels are provided in a priority oriented network. The priority interrupt system itself provides up to forty-eight interrupt lines in addition to the common line, and 48 memory cells are reserved for use as entrance registers.

The magnetic tape unit shown in FIG. 3 is of commercial design, intended for use in digital data processing systems. It is used to record track history data so that quantitative studies may be made of the system while in an operational environment. It will also be used to load programs into the computer 68, and, as hereinabove stated, interfaces directly therewith. This teletype unit is also a commercial unit and is used primarily during test modes to enter specific test program instructions. The adapter group or subsystem, generally indicated at 36 in FIG. 3, includes the display control converter 368 (which contains an angle converter and display controller to be described) and a weapons control converter 380 which provides, in the illustrated embodiment, the capability for direct target designation on line 56 from the proposed system comprising the present invention to a conventional fire control system. The converter 380, which may be in the form of a standard digital-to-analog converter, is interposed between the ship's weapons direction equipment (WDE) and the usual fire control switchboard, where it is used to substitute data from the proposed system for that from the weapons direction equipment, when an appropriate system designation is selected by the operator. The converter 380 also receives repeatback data from the fire control system for transfer to the computer 68. In other words, normally, designation data from the ship's weapons direction equipment WDE is routed through relays in the converter 380 to the fire control switchboard. When the appropriate designation is initiated at the track status control (to be discussed hereinafter), these relays are controlled to disconnect weapons direction equipment data from the fire control switchboard and substitute designation data, in analog form, from the computer 68 and, at the same time, an analog signal designating the assigned director is transmitted from the converter 380 to the fire control switchboard. The converter 380 subsequently receives director-on-target signals which are processed to display director statuses at the track status indicator (to be described hereinafter).

The display control converter 368 serves two functions in the system of the present invention, i.e., the angle conversion and display control. More particularly, angle converter portion of converter 368 acts as a multipurpose azimuth converter for the system, by digitizing 2-D synchro coordinate data for use in the data converter 66, by converting the 2-D synchro coordinates into x-y display information for use in the track data indicator portion of the operator's display, and by converting digital 3-D coordinates into x-y display information.

Figure 11:
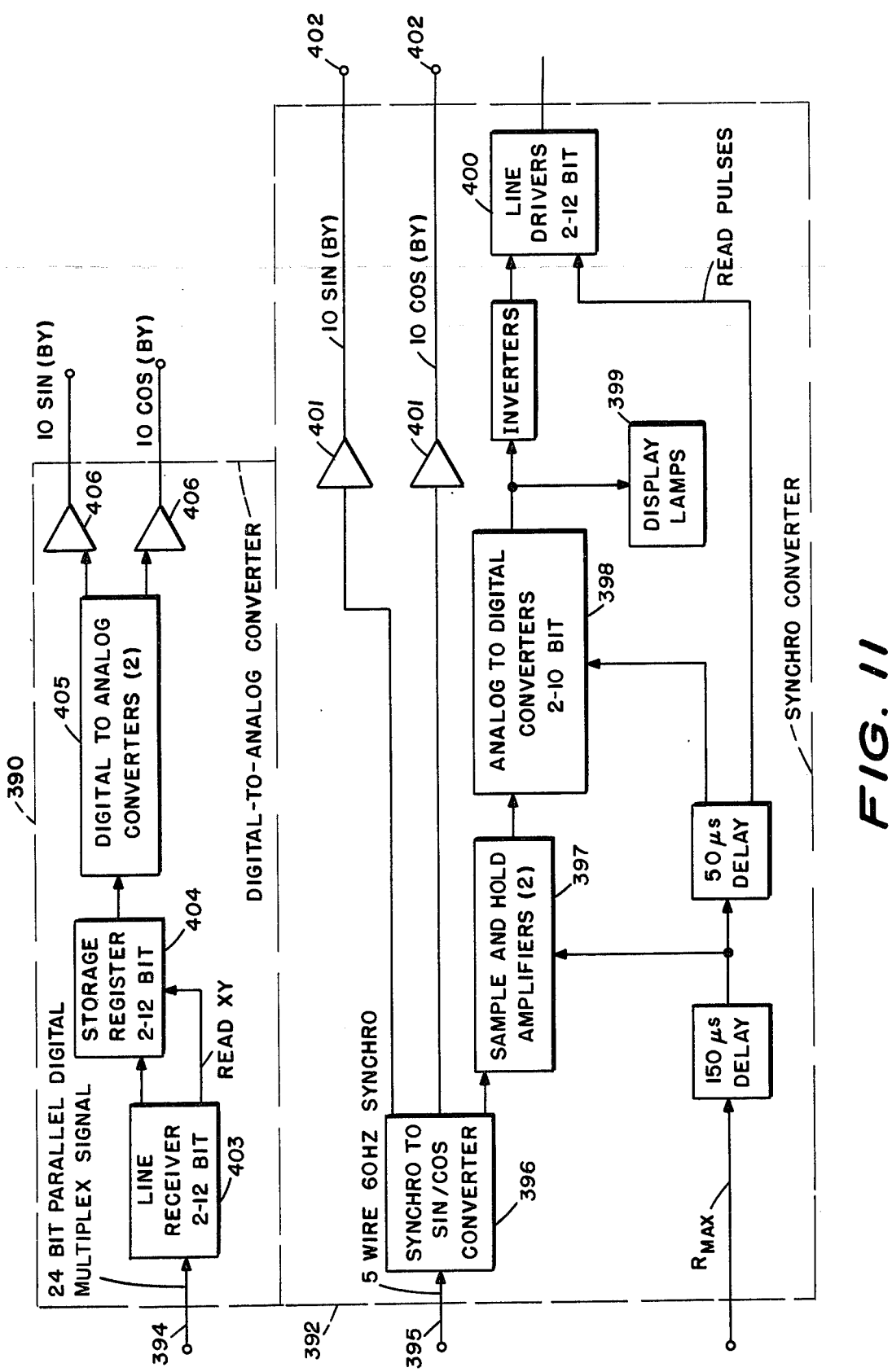
FIG. 11 is a block diagram of an angle converter unit utilized in the invention.

The details of the angle converter portion of converter 368 is shown in block diagram in FIG. 11, and it consists of a digital-to-analog converter 390 and a synchro converter 392. The digital-to-analog converter 390 receives digital coordinate information on line 394 from the 3-D radar 44 and converts it, as will be described, to analog form for transmission, as an x-y sweep signal, to the control and display subsystem 38 (FIG. 3). The synchro converter 392, on the other hand, receives 2-D coordinate information, in five-wire synchro form, on line 395 and converts this signal both to digital form, for use by the computer 68 in performing hit correlation, and to an x-y coordinate analog signal for transfer to the subsystem 38.

Synchro converter 392 is comprised of a synchro-to-sine/cosine converter 396, two sample-and-hold amplifiers 397 and two 10-bit analog-to-digital converters 398. Parallel digital outputs of the analog-to-digital converters 398 are connected to display lamps 399 and to line drivers 400 that output, for example, zero volts for a logic 0 and −8 volts for a logic 1 for ultimate use by the computer 68. Scalar amplifiers 401 connect directly to the synchro converter 396 and provide unity-gain line drivers for the x-y deflection signal outputs on lines 402 to the control and display subsystem. The analog-to-digital conversion performed, e.g., utilizing converters 398, is synchronized to the end-of-sweep ($R_{max}$) trigger from the 2-D adaptive video processor 62, such that the sine and cosine are sampled from $R_{max}$ to $R_{max}$ + 150 μsec., analog-to-digital conversion starts at $R_{max}$ + 150 μsec., and the read (x-y) signal is output at $R_{max}$ + 200 μsec.

As noted, data received by the D/A converter 390 consists of a 24-bit parallel digital multiplex signal representing the coordinate data for the 3-D radar 44. Specifically, in one practical application of the proposed system, such coordinate data is received by line receivers 403 and converted to zero to plus 5 volt TTL levels. When a 24th bit is sensed by the line receivers 403, a read x-y pulse is initiated and strobes the data from the line receivers 403 into the storage register 404. When the read x-y pulse disappears or goes back to a logic zero, the data is then sent to the digital-to-analog converters 405 where it is converted to analog form and output by unity-gain line drivers 406 in a scale of 10 sin BY to 10 cos BY as an x-y sweep signal to the control and display subsystem 38 of FIG. 3.

In addition to performing angle conversion, as just described, the display control converter 368 interfaces the input/output channels of the computer 68 with the various display and control units of the proposed system. Thus, the display control converter unit 368 communicates directly with the input/output channel of the computer, decodes information from the computer and distributes it to the various display and control devices of the system, and formats information from these display and control devices into appropriate data processor words and sends them on to the computer via an input/output bus. The operating specifications for the Honeywell DDP-516(R) Data Processor capable of use as computer 68 are well-known, including all of the control lines and control instructions used by the processor both for the input and output data, both on the normal I/O channel and via the data multiplex control.

Interface between the computer 68 and the various display and control devices in the proposed system is performed by a plurality of discrete controllers within the unit 368 (FIG. 3), each controller being capable of inputting data into the computer 68 from the associate display and control devices and of outputting data from the computer to such associated display and control devices. As examples: (a) input and output data to and from the illustrated radar processor control (RPC) block 422 of FIG. 3, to be described hereinafter, are controlled by an associated RPC controller within display control converter 368; (b) a scan history display and counts-readout controller controls data output from the computer 68 to both a scan history display (SHD) and a counts-readout display, to be described; (c) a direct-designate controller interfaces the computer 68 and the weapons control converter 380 (FIG. 3); (d) a system monitor and control (SMAC) controller, as will be described, formats operator-selected, target threat criteria requests into proper data-processor words for transmission to the computer and, in response, receives data from the computer with which to generate a composite video signal for TV monitoring; and (e) a coded time controller controls decoded IRIG-B (Inter-Range Instrumentation Group) coded time and inputs these data into the computer.

Referring again to FIG. 3, the control and display subsystem 38 includes an interface unit 420 for a ship's radar repeater, the radar processor control 422, the track data control and display portion 424, and a summary status control and display portion 426, all of which will be described hereinafter.

The radar processor control apparatus 422 provides the operator with the capability of optimizing the automatic detector-tracker system performance for the particular radar environment in which the system is then operating. Thus, in the illustrated embodiment, the apparatus 422 includes an appropriate operator display/control panel whereby the operator can obtain indications of overall system performance and can establish operational control in a plurality of range, bearing and elevation sectors, as will be described. In the illustrated embodiment, the radar processor control 422 includes a circular grid display which is arranged to provide 12 30° bearing wedges and four concentric range rings. Within each of the 48 sectors thus formed are located three (red, amber and green) small lamps which are illuminated by signals from the computer 68 to indicate the level of activity in the sectors. For example, an energized green light indicates that an optimum number of radar returns are being received within the illuminated sector, the amber bulb indicates when lit that the system is approaching saturation in its ability to process ungated hits for that particular sector and therefore threshold control is needed, and an illuminated red light shows that target entry processing time into the computer is being saturated and therefore logic control is needed at the computer. No lighted sector, conversely, indicates very low activity in that sector and an increase in input data will not degrade system performance. In the illustrated embodiment, for any of the 96 possible sectors (12 bearing × 4 range × 2 elevation), an operator can select any of four video processor threshold levels, ranging from video blanking to very high sensitivity, to control the number of radar returns input to the computer, and the operator can also select, by sector, any of four computer software detection logic levels ranging from detection blanking to high sensitivity in order to control the entry and updating of tracks.

Figure 12:
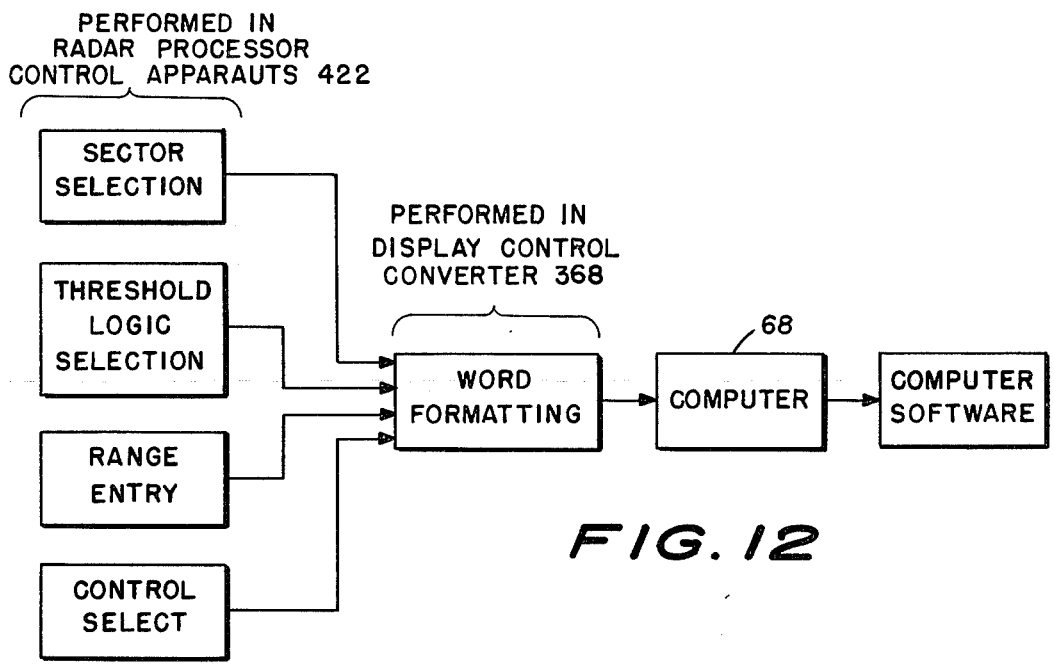
FIG. 12 is a simplified block diagram showing information flow from the radar processing control to the computer.
Figure 13:
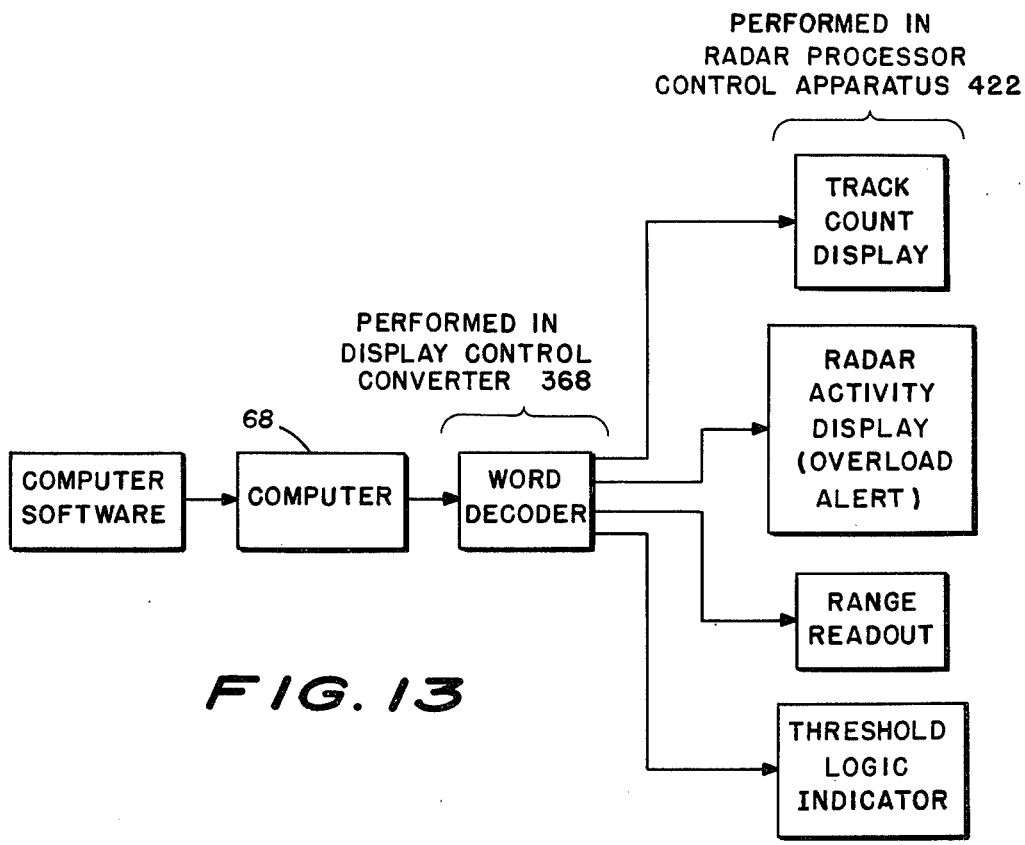
FIG. 13 is a simplified block diagram showing information flow from the computer to the radar processing control.

From the above, it should be understood that with the radar processor control 422, the performance of the proposed system of the invention can be optimized within any specific portion of the radar surveillance volume. For example, those sectors on the display which contain clutter can be desensitized without reducing the detection sensitivity to targets in clear areas. Conversely, sectors can be set up to enhance target detection in special clear areas of interest without causing overall overloading conditions. Moreover, because an automatic system of the type proposed may attempt to process all radar activity within the entire radar volume, and because this activity can be very high in certain radar environments, the use of the radar processor control apparatus 422 is quite valuable for optimizing system performance. In the drawings, FIG. 12 is a simplified block diagram showing the information flow from the radar processor control 422 to the computer 68; whereas, FIG. 13 is a similar diagram showing the reverse information flow from the computer 68 to said control 422.

Figure 14:
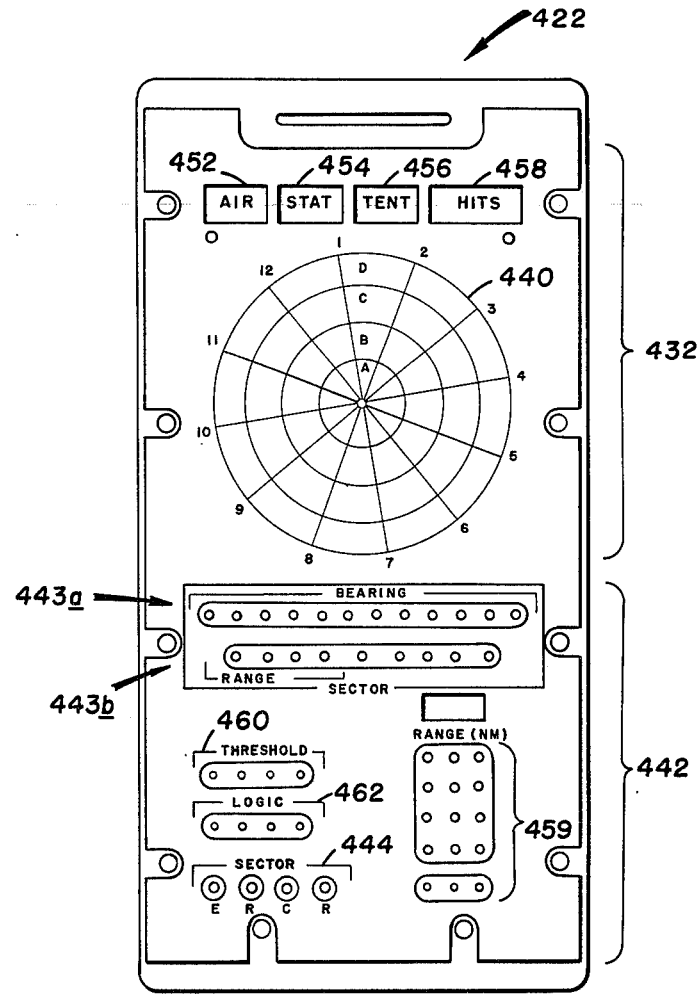
FIG. 14 is a pictorial representation of the radar processing control panel.

A more detailed discussion of the radar processor control apparatus 422 follows. Referring to FIG. 14, the processor control apparatus 422 includes, in the illustrated embodiment, a suitable control panel which is divided into an upper display section 432 containing grid display 440, and a lower control section 442 containing an array of illuminated pushbuttons. The illustrated pushbutton array 442 is arranged for selecting bearing sectors 1-12 across the top row 443a; whereas bottom row 443b contains four pushbuttons for selecting range sectors A-D, a pair of high/low elevation sector selection pushbuttons, and two additional pushbuttons for selecting all-range or all-bearing sectors respectively for control. Four action pushbuttons 444 located on the lower left-hand side of the panel are also used, as follows: the ENTER pushbutton (E) enters threshold and logic controls into the selected sector or sectors; if the operator wishes to interrogate an already established threshold and/or control logic, he may do so by depressing the READ pushbutton (R); if the operator makes a mistake in setting up the sector or control, he can restore these settings to initial conditions by depressing the CLEAR button (C); and, finally, if the operator wishes to initialize the radar processor control unit 422 to nominal settings of threshold, logic and range boundaries, he may do so by depressing the RESTORE pushbutton (R). Across the top of the illustrated control panel are light emitting diode (LED) readouts to display the number of firm air tracks 452, fixed or stationary (STAT) tracks 454, tentative (TENT) tracks 456 and hits 458 (number of radar returns processed by adaptive video processor into the computer 68). These data are updated once every radar scan, as will be described. The keyboard 459 in the lower right-hand corner of the control panel is used to enter the boundaries of the range sectors A, B and C into the computer.

Controls for reducing sensitivity of the system, in the event of hit/store saturation or data processing timeout, include the four threshold level pushbuttons 460 and the four logic level pushbuttons 462 located near the lower left corner of the control panel of FIG. 14. As previously mentioned, these controls provide varying degrees of sensitivity ranging from the processing of all hits within a sector to the blanking of all hits within a sector.

Figure 15:
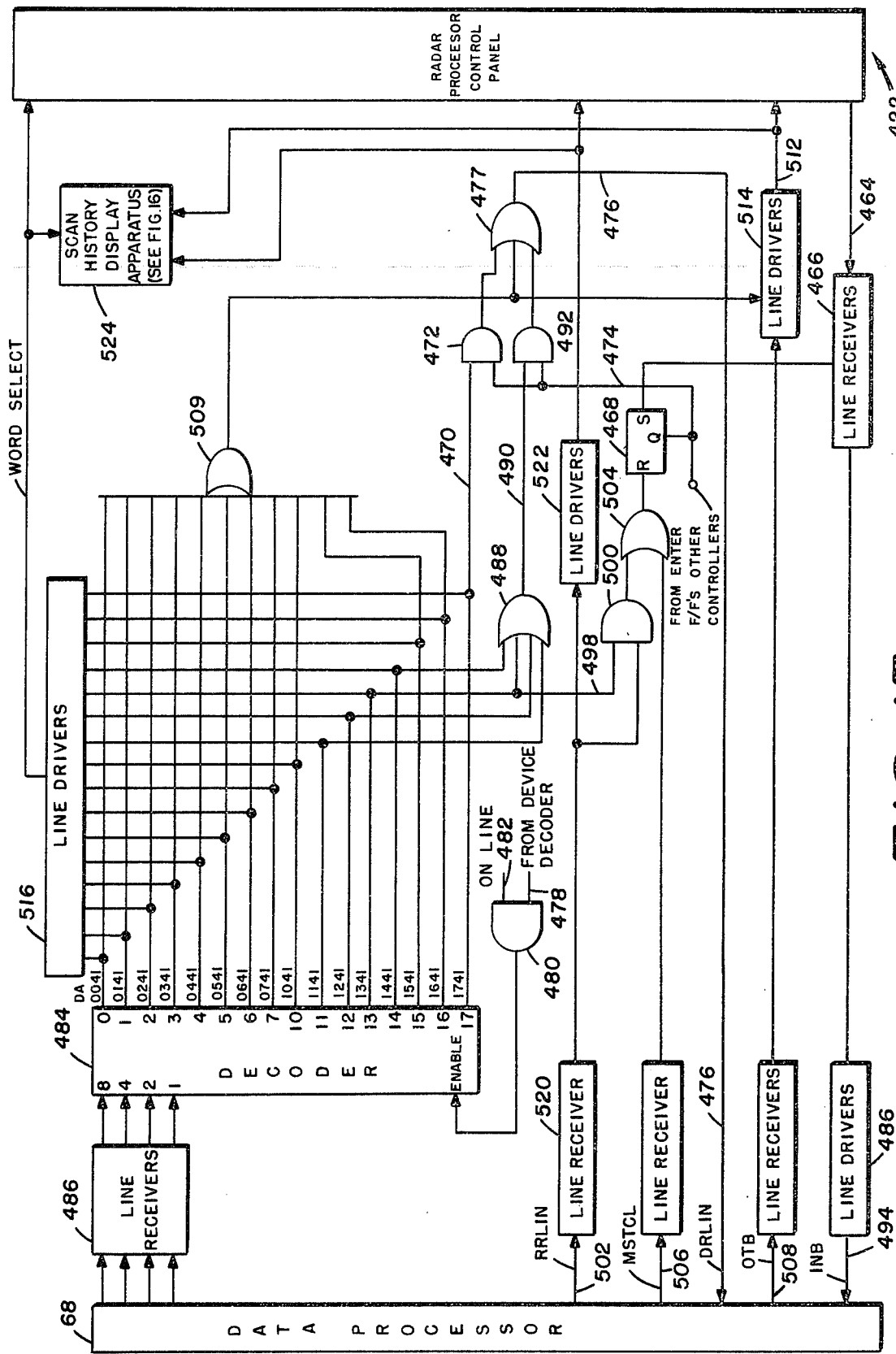
FIG. 15 is a block diagram of input and output sections of the radar processing controller.

Referring to FIG. 15, the controller (located in display control converter 368) for the radar processor control apparatus 422 includes input and output sections which use the same parts and share the same control lines, but work independently of each other under control by the programmed computer 68. More specifically, when the control apparatus 422 has data such as new boundaries for the range sectors ready for input into the computer 68, it sends out an ENTER signal on line 464 to the controller apparatus of FIG. 15. The controller receives this signal on a line receiver 466 and sets the ENTER flip-fop 468. When the computer 68, during its normal routine, interrogates the display control converter 368, it performs an SKS-1741 (Sense and Skip) instruction which is simply a general interrogation instruction asking the display control converter 368 whether any of the controller units therein have an ENTER flip-flop set. Thus, with the ENTER flip-flop 468 of FIG. 15 set, as just described, the SKS-1741 instruction (appearing on line 470) is ANDed in gate 472 with the Q output of any set ENTER flip-flop, on line 474, within the display control converter 368 and the device ready line (DRLIN) 476 is set through OR gate 477. When the computer 68 has received the DRLIN, a program skip is performed and the computer 68 will sequentially interrogate each address within the display control converter 368 via specialized SKS instructions. For example, when the computer 68 sequences to an SKS 1141 interrogate instruction associated with a specific control/display function within radar processor control apparatus 422, the address bus is sent out to the controller of FIG. 15. The first 6 bits of the address bus are decorded via a device decoder (not shown) whose output on line 478 is then ANDed in gate 480 with the on-line signal on line 482 and sent to a 1-of-16 decoder 484 as an enable signal. The remaining four bits of the address bus are sent, via line receivers 486, into the 1-of-16 decoder 484 when the selected 1 of 16 device address lines is set in accordance with the condition of the control panel of FIG. 14.

Assuming, for example, that the device address labelled 1141 at the output of decoder 484 is set, the OR gate 488 produces a signal on line 490 that is ANDed in gate 492 with the output on line 474 for the ENTER flip-flop 468. This again sets the device ready line DRLIN which causes another skip in the program of the computer 68 and, by way of example, three INA (input A register command) instructions might be performed corresponding to device addresses DA 1141, DA 1241 and DA 1341. When INA 1141 is performed, the address bus is set to DA 1141, at which time a DRLIN control input is again sent to the computer and the contents of the input bus 494 received from the control panel 422 via the line receivers 466 and the line drivers 496, is strobed into the A register of the computer 68. When the computer 68 has received these data, the next INA instruction is performed because the ENTER flip-flop 468 is still set; that is, an INA instruction 1241 will then be performed, causing the DRLIN line 476 again to be set and the data on the input bus INB line 494 (from the device associated with address DA 1241) to be strobed into the A-register. Subsequently, because the reset ready line (RRLIN) has not been set, computer 68 will perform the INA 1341 instruction, the DRLIN line 476 is set, and the date from the device associated with address DA 1341 is strobed into the A-register of the computer 68. When the device address DA 1341 on line 498 is later ANDed in gate 500 with the reset ready line (RRLIN) 502, which is output from the computer 68 to inform the controller apparatus that the data have been received, the OR gate 504 operates and resets the ENTER flip-flop 468 to inhibit the device ready line 476. At this time the computer 68 proceeds to the next SKS instruction. As shown, OR gate 504 also responds to the master-clear signal appearing on the MSTCL line 506 from the computer.

In the output mode, the computer 68 performs nine sequential OTA instructions (output computer instruction to whatever is in the A-register) which are, in essence, forced upon the radar processor control 422 whether the ENTER flip-flop 468 is set or not. Thus, when an OTA instruction is performed by the computer 68, the 16 lines of the output bus (OTB) 508 are set with the appropriate information to the controller and the address bus is set to the particular address or function which the OTB information is to perform. In the case of the radar processor control 422, for example, the first OTA instruction to be performed would be 0041 and, as before, the first 6 bits of the address bus will be decoded to provide a device code which is ANDed, at gate 480, with the online signal 482 to provide an enable to the 1-of-16 decoder 484. Similarly, the remaining 4 bits, the instruction field of the address bus, will be decoded to provide the remainder of the device address, e.g., DA 0041 through DA 1041.

These device address signals are then ORed in gates 509 and 477 and sent back down to the DRLIN line 476 to inform the computer 68 that the radar processor control apparatus 422 is ready to receive data. At the sme time that DRLIN 476 is set, the line 512 leading to control panel 422 is enabled via the drivers 514. Moreover, the device address line, in this case DA 0041 corresponding to the first OTA instruction, will be output to the radar processor control apparatus 422, via line drivers 516, and upon receipt of the DRLIN (Line 476) which also results, the computer 68 will then output with the reset ready line (RRLIN) 502. This reset ready line control will be received by line receiver 520 and send through a line driver 522 to the control apparatus 422 where the WORD SELECT device address and the output bus will be strobed into the appropriate buffer in control apparatus 422 corresponding to the control/display function being performed; e.g., updating the information display at circular grid display portion 440 regarding system activity level. Nine such OTA instructions will be performed, as stated hereinabove, in the sequence from DA 0041 to DA 1041, to strobe all nine output words and addresses into the control apparatus 422. When the final OTA instruction 1041 is ended, the computer 68 then proceeds to the next instruction is strictly software oriented in that there is no response required from the radar processor control apparatus 422 other than from the device ready line (DRLIN) 476, as noted, and an OTA instruction is considered finished when a reset ready line (RRLIN) 502 is set.

As noted earlier, a separate controller unit within display control converter 368 of FIG. 3 controls data output to a scan history display, to be described, and to the LED counts-readout displays 452, 454, 456, and 458 on the radar processor control panel shown in FIG. 14. This controller is similar in operation to the controller apparatus of FIG. 15. For example, in order to control up-dating of the counts-readout displays, when the computer has up-dating data ready, four successive OTA instructions will be performed along with the appropriate device addressing operations, whereby the contents of output bus is strobed successively into the four counts-readout displays.

The scan history display apparatus proposed in accordance with the present invention is designated generally at block 524 in FIG. 15. As will be described in more detail hereinafter, in this scan history mode, a display is provided of track histories over eight radar scans showing worm-like movement of target trails and direction of motion. This enables the operator to locate more readily a target through a jamming or clutter environment.

Figure 16:
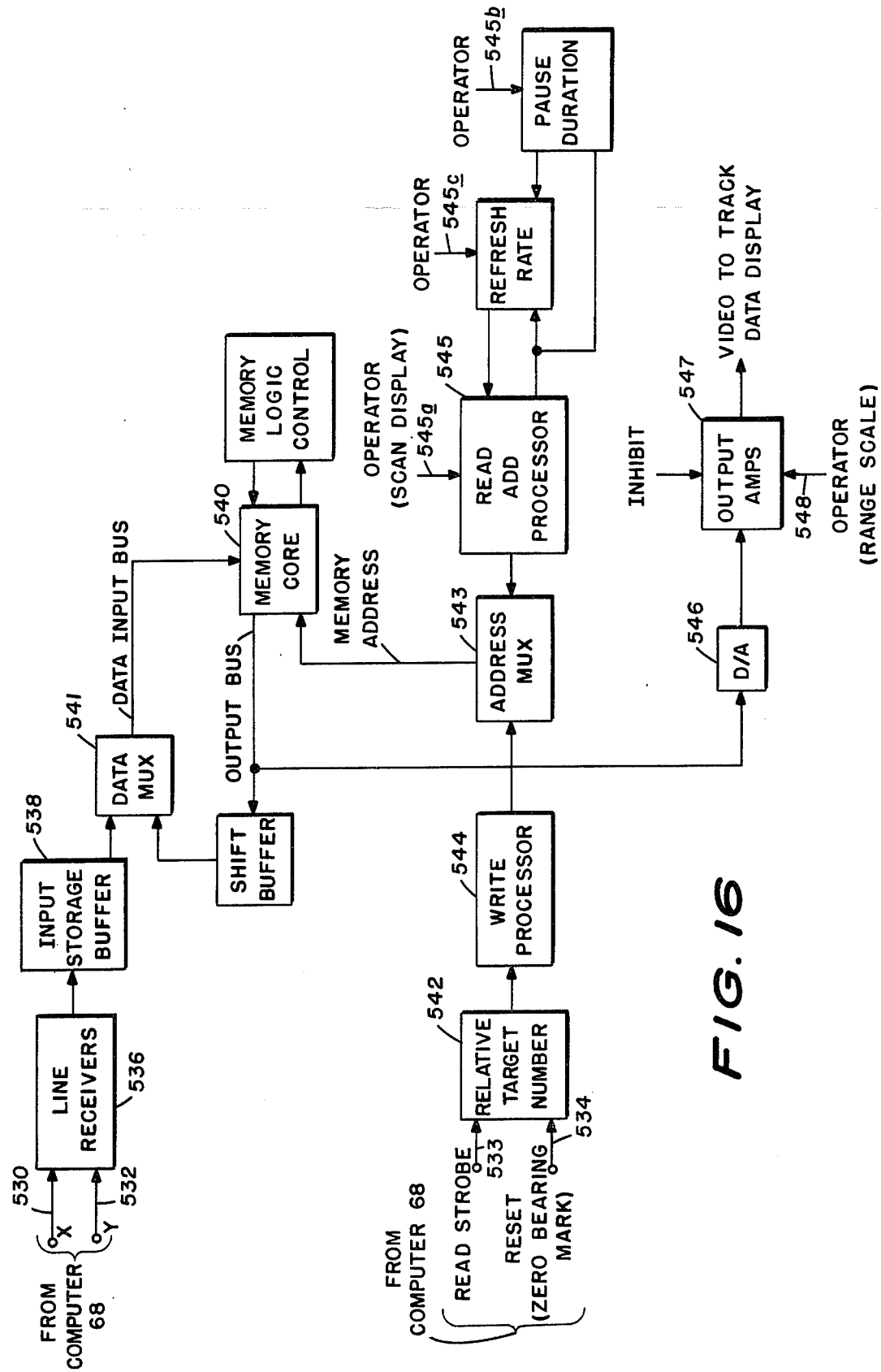
FIG. 16 is a block diagram of the scan history display unit of the invention.

The scan history display (SHD) mode is shown in functional block diagram form in FIG. 16. More specifically, the computer input functions to the SHD include an X-coordinate word on line 530, a Y-coordinate word on line 532, a READ STROBE on line 533, and a RESET control line 534. The X and Y words are buffered through line receivers 536 and held in storage buffers 538 until entered into the SHD memory core 540. Until the SHD has completely processed the input storage buffer 538 contents, a ready signal (RRLIN) inhibits further transmission from the computer 68. As up-date target position enters into the storage buffer 538, it is given a pseudo target number pertinent only to a current scan; i.e., the same target entered in two successive scans should likely have different target numbers. This target number represents a partial address of where the X-Y coordinates are stored in the SHD memory core 540. By way of example, the relative target number could be generated utilizing a counter incremented for each input buffer update and reset at the zero bearing mark. The target number specifically designates a sixteen word scan block for storing the input buffer contents, which storage operation will now be described.

In the illustrated embodiment, the SHD memory 540 could be, for example, a 4000 word by 16 bit magnetic core logically arranged into 256 blocks of 16 words. Each 16 word block is then called a scan block and, since each target requires two words, eight scans for 256 targets can be stored. The first word in a scan block corresponds to a target position in the current scan and the last word in the scan block corresponds to target position in the eighth elapsed scan. The two-word sections in a scan block are numbered Scan No. 1 through No. 8. Each target update is entered into the scan No. 1 position of the associated scan block via data multiplexer 541 and all previously stored scan block contents are shifted down one scan number and the oldest target coordinates in the scan No. 8 location are dropped. Since each scan block consists of exactly 16 words, the relative target number produced at counter 542 is actually contained in the eight most significant bits of a 12 bit memory code address word applied to memory 540 via address multiplexer 543, the lower 4 bits controlling, by means of write processor 544, according to a shift and write updating process. As noted, target data inputs during a scan are stored in consecutive scan blocks. Also, the illustrated target number counter 542 of FIG. 16 is reset to zero at the radar bearing zero crossing, this reset action actually being a process in which the 8 bit counter is clocked from its state at the time of zero bearing crossing, through roll-over to zero. At each interim count the shift and update process is exercised, entering a zero into the scan No. 1 position of each scan block. During this process, the input is inhibited from accepting new data.

Between target updates, stored target coordinates are displayed. For this purpose, there exists a twelve bit free running address counter in the illustrated read address processor unit 545 which selects consecutive target locations for display. The counter is sectioned into three parts or functions, as follows: the upper eight bits address consecutive scan blocks, resetting itself every 256 counts so that targets are displayed in the same order as they were received; the next lower three bits address the scan number and are decremented after a variable number of roll-overs, these three bits specifying which scan number is displayed for each of the 256 target scan blocks so that inhibiting this counter from decrementing provides a mechanism for continual display of the same scan number; and, the last bit of the display address is the X-Y bit state, that is, a logical zero indicates an X-coordinate is read, and a logical one indicates a Y-coordinate is read. By means of the illustrated scan display control 545a, the operator can select the number of scans (up to eight) to be displayed. Also, the time duration between display of different scan blocks is an operator entry represented at 545b and sets the time period in which the 3 bit down counter is inhibited from changing from a state of zero. Controlling the counting frequency of this same counter is another operator entry, shown at 545c, and is the refresh rate function which determines the rate at which the successive positions of a target are displayed.

After each X-Y read cycle, described above, the digital target coordinates output from the core 540 are D/A converted and amplified at 546 and 547 respectively, and then displayed. The X-Y coordinates occupy the lower 12 bits in each word read out of the memory, with upper 2 bits in the X-coordinate word serving special functions, if needed. Thus, in one practical application, no target position is displayed unless bit No. 1 in the X-coordinate word is set; whereas, if only those targets considered as being firm in character should be displayed, bit No. 2 in the X-coordinate word is scrutinized and only if this bit is also set will the target set the displayed. The range scale on line 548 is an operator entry and varies the gain of the output deflection amplifiers 547.

Figure 17A:
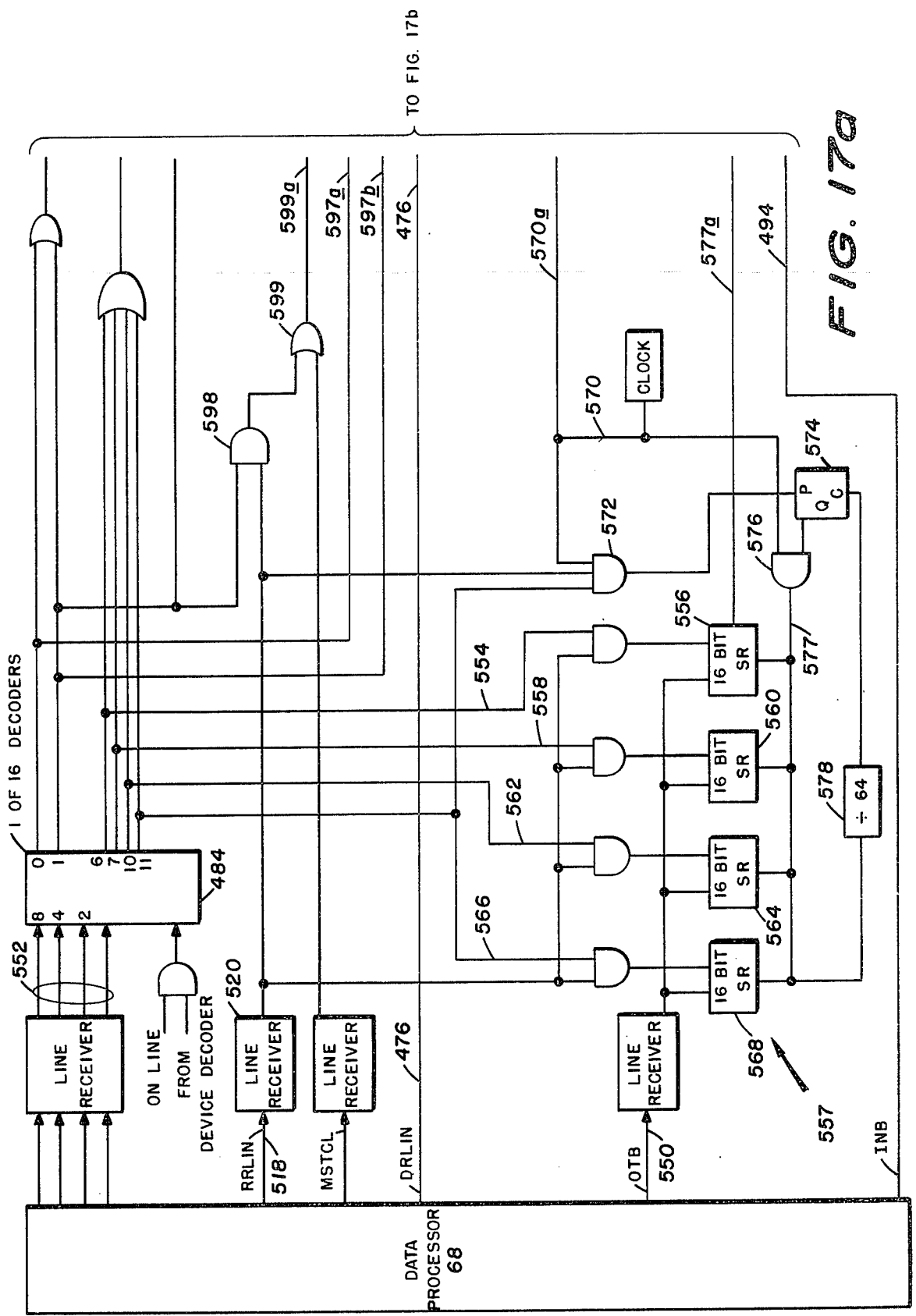
FIGS. 17a and b constitute a block diagram of the weapons direction converter of the invention.

The controller portion of display control converter 368 associated with the weapons direction control converter 380 of FIG. 3 is shown in FIGS. 17a and b. It receives four OTA instructions from the computer 68, format these words into a 64-bit serial word and transmit this serial word to the converter 380. Thus, referring to FIG. 17a, when the computer 68 has data ready for the converter 380, the computer will perform four successive OTA instructions. When the first OTA instruction is initiated, data will be placed on the output bus 550 and on the address bus 552. The address bus 552 will be decoded in decoder 484 and output a DA-0645 instruction on line 554, which will strobe the first word on the output bus 550 into the first 16 bits 556 of the four stage 64-bit shift register combination designated at 557. Similarly, upon initiation of the second OTA instruction DA-0745 on line 558, the second output word on 550 will be placed into the second bit group 560 of the 64-bit shift register; the third OTA instruction is performed DA-1045 will be output on line 562 and will strobe output bus 550 into the third 16-bit shift register 564; and, when the fourth OTA instruction DA-1145 on line 566 is received, it will strobe data into the fourth 16-bit shift register stage 568.

All of the device addresses that successively strobe the four words into the 64-bit parallel serial converter, as just described, are synchronized with the reset ready line (RRLIN) 518 which is set via the device ready line (DRLIN) 476 input to the computer 68. Upon receipt of the fourth or last OTA instruction, the corresponding output of the device address decoder 484 (DA-1145 on line 566), RRLIN 518, and a 500 KHz clock signal on line 570 are ANDed together in gate 572 to preset a parallel-to-serial clock flip-flop 574. The Q output of the flip-flop 574 is ANDed again in gate 576 with the clock signal 570 and the resulting control signals on line 577 start strobing the contents of the 64-bit register 557 formed by shift registers 556, 560, 564, 568, into the converter 364 as 64-bit serial data on line 577a extending between FIGS. 17a and b. At the end of the 64th count, a divide-by-64 counter 578 will output a pulse clearing the parallel-to-serial flip-flop 574 and stopping the strobe input 577 to the 64-bit shift register 557. The 500 KHz clock pulses on line 570 are also continually applied via line 570a in FIGS. 17a and b to line drivers 582 and to the weapons direction converter 380.

Figure 17B:
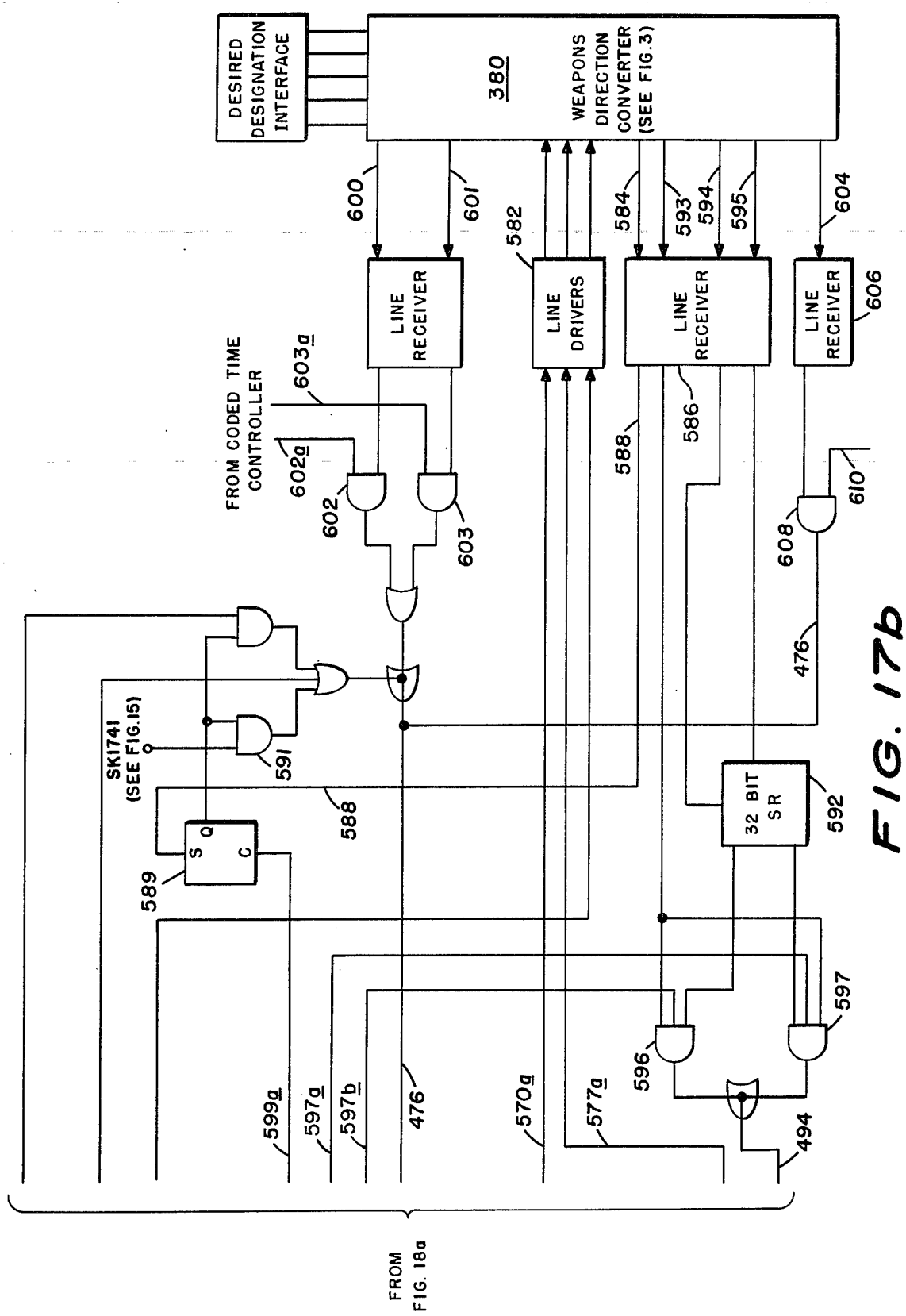

Conversely, when the weapons direction or direct designate converter 380 has data ready for the computer 68, it will send an appropriate (referred to as TRANSFER DD) signal on line 584 of FIG. 17b to the controller apparatus which, via line receivers 586, will produce an ENTER DD signal on line 588 which sets an ENTER flip-flop 589. When a sense and skip instruction SKS-1741 is output from the computer 68 and appears at the output of decoder 484 (see FIG. 15), AND gate 591 operates and sets the device ready line (DRLIN) 476 which, in turn will cause a program skip and the computer 68 will start interrogating each control function code sequentially within the display control converter 368. Thus, when an SKS instruction 0045 is performed, the controller outputs a DRLIN on line 476, causing another program skip. This time the program will perform two INA instructions. The first one, INA-0045, will again set the DRLIN, at which time the contents of the first 16 bits of the 32-bit serial-to-parallel converter 592 (see FIG. 17b) will be strobed into the computer 68. Prior to this, the converter 380 will send a SEND DD signal on line 593, a serial data signal on line 594 and a serial-to-parallel clock (SPCL) signal on line 595. The SPCL signal will strobe the serial data line 594 into a 32-bit shift register 592, and when the shift register has been completely loaded, the parallel contents of register 592 will be present at two series of AND gates 596, 597 at the output of the shift register. Upon receipt of a SEND DD signal, an INA instruction, and device addresses of 0045 and 0145, on lines 597a and b respectively, the first and then the second 16-bit words will be strobed out of the 32-bit shift register 592 and sent to the input bus 494 of the computer. Upon receipt of the data on the input bus 494 for INA instruction 0045, the computer will output a reset ready line signal on line 518 which is ANDed in gate 598 with device address 0145 and, via OR gate 599 and line 599a, clears the ENTER flip-flop 589 of FIG. 17b. The program will then perform the next SKS instruction.

Additional outputs from the illustrated converter 380 include repeatback signals from the associated fire control systems, representing Director On Target for a first fire control system (DOT 1) on line 600 in FIG. 17b and Director On Target for a second fire control system (DOT-2) on line 601. Repeatback signal DOT 1 is ANDed in gate 602 with a SKS instruction on line 602a and DOT 2 on line 601 is ANDed in gate 603 with the SKS on line 603a. The 1-of-16 decoder for these two particular SKS instructions 602a and 603a is located in the coded time controller unit of control converter 368. If the device ready line 476 (DRLIN) is set during either one of these two SKS instructions, the program knows that one or both of the directors (DOT 1 and/or DOT 2) are on target.

An additional input may be received by the controller of FIGS. 17a and b, if desired, as from a line printer interface. Such a signal, if received, would be an output data request on line 604 and would be received by line receivers 606 and ANDed in gate 608 with, for example, the output of the SKS instruction on line 610. When this SKS is performed by the computer, the DRLIN 476 will be set, causing a program skip and thereafter, the program will perform four OTA instructions in the same manner as described hereinabove. The only difference would be the formats of the four 16-bit words.

Figure 18A:
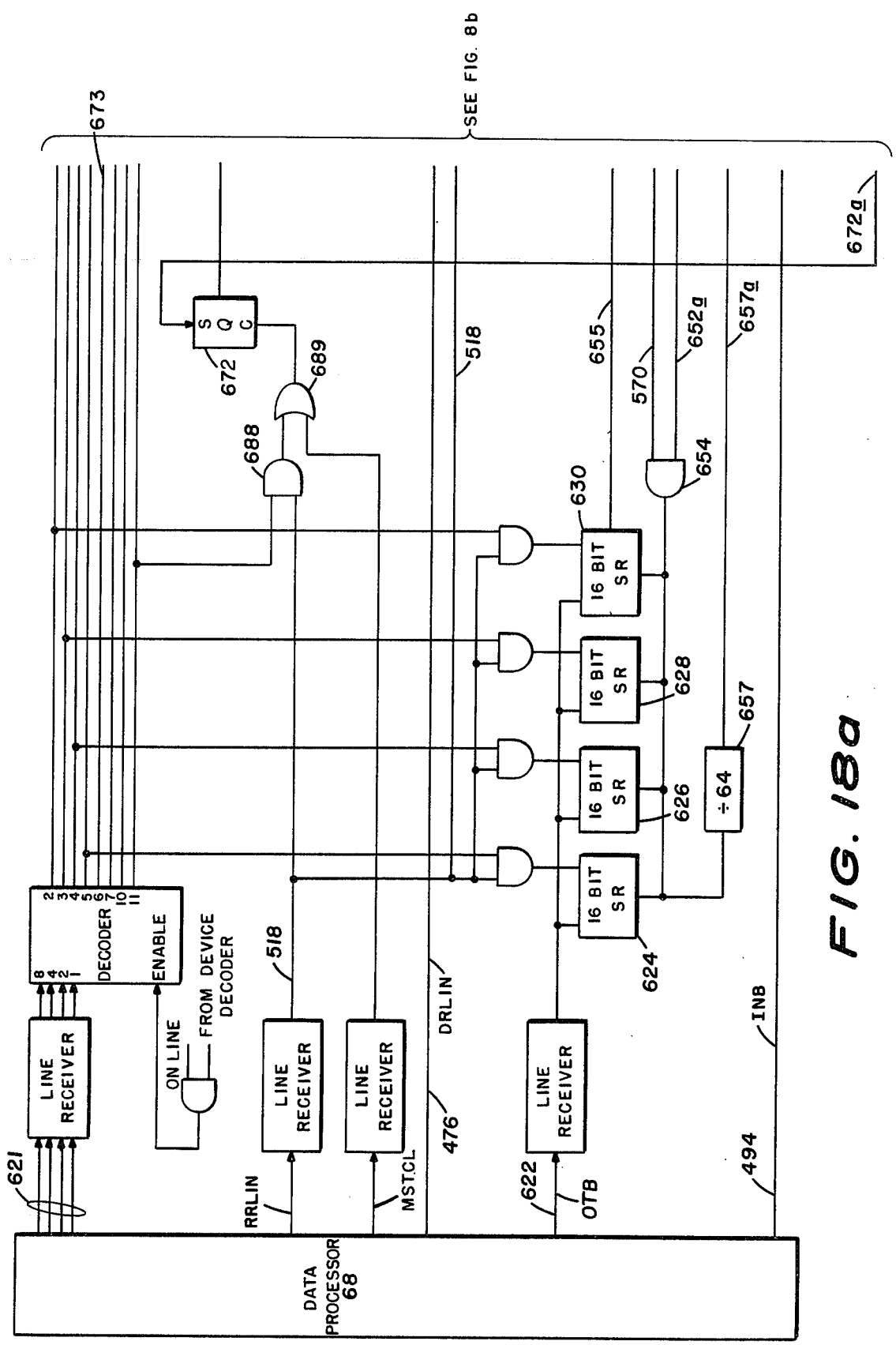
FIGS. 18a and b constitute a block diagram of a controller for the track data control and indicator of the invention.

The controller for the track data control and display unit 424 of FIG. 3 is also contained in the display control converter 368 and is shown in block diagram in FIGS. 18a and b. This particular controller controls input and output data to a symbol display unit such as that represented at 620 in FIG. 18b and which can be located on a central display console and/or in each of several radar repeater interface units such as are shown at 420 in FIG. 3.

When the computer 68 is ready to output data to the symbol display unit 620, the computer again performs four OTA instructions on lines 621. As these instructions are initiated, the data are sent out on the output bus 622 and input sequentially to the four 16-bit registers 624, 626, 628 and 630, in a manner previously discussed. When the RRLIN 518 is ANDed in gate 646 (see FIG. 18b) with the fourth instruction word on line 648 and the output from the clock 570, the clock flip-flop 652 is set. The Q output of the flip-flop 652 is then applied over line 652a and ANDed in gate 654 with the output of the clock 570 in order to strobe the four 16-bit shift registers 624, 626, 628, 630, into the symbol display unit 620 (or shipboard displays) in the form of a 64-bit serial transmission on line 655. In addition, the continuous 500 KHz clock output on line 570 is sent directly to the symbol display unit 620 via line drivers 656. After the 64th count, the divide-by-64 counter 657 (FIG. 18a) outputs a pulse over line 657a to the clock flip-flop 652, resetting it, and therefore inhibiting the clock from strobing any more data onto the serial data line 655.

When the symbol display unit 620 has data ready for the computer 68, on the other hand, the symbol display unit will output a serial data line 658 to the controller shown in FIG. 18. When said data is received it will be ANDed in gate 660 with the clock 570 and will preset an additional clock flip-flop 662, the output of which is ANDed again with the clock signal 570 at gate 664, to produce a serial-to-parallel clock which strobes the serial input data on line 658 from the symbol display unit 620 into four 16-bit shift registers 665, 666, 667 and 668. When this data strobing operation is complete, the divide-by-64 counter 669 will reset the serial-to-parallel clock flip-flop 662, therefore inhibiting the strobing of more data into the shift registers 665–668.

When bits 8, 48, 49, 50 and 51 are sensed, they are ANDed together in gate 670 and output via gate 671 which ANDs these data bits with the serial data output 658 from the symbol display and thereby sets the ENTER flip-flop 672 (see FIG. 18a) over line 672a. The ENTER flip-flop 672 will remain set until the computer 68 performs an SKS 1741 and then an SKS-0641. When an SKS-0644 is sensed the DRLIN 476 will be set, via line 673 and OR gates 673a and 674, and cause another program skip. The program will then do four INA instructions, i.e., INA-0644 through INA-1144.

When INA-0644 is performed, the address bus 621 will output a DA-0644 on line 673 and send these data to an encoder 676 in FIG. 18b which, in turn, will (a) output a gate signal pulse on line 678 to an AND gate 680, and (b) also output two signals on line 682 and line 684 respectively. When DA 6644 is sensed, the signals on lines 682 and 684 will be set to zero, causing the one-quarter multiplexer 686 to strobe the contents of the first 16-bit shift register 668 onto the input bus 494, through gate 680. When the second INA instruction is performed (INA-0744), DA 0744 will be input to the encoder 676 and the gating signal on line 678 will again be sent to the AND gate 680. This time, however, the signal on line 682 will be reset and the signal on line 684 set, which will cause a word from the second 16-bit shift register 667 to be strobed through the multiplexer 686 and onto the input bus 494. Similarly, when the third INA instruction is performed, an INA 1044 signal will be sent to the encoder 676 and cause the signal on line 682 to be set, while the signal on line 684 will be reset. As a result, the contents of the third 16-bit shift register 666 to be sent through the multiplexer 686 and onto the input bus 494. When the fourth INA instruction is sensed, DA 1141 will be sent to the encoder 676 and lines 682 and 684 will both be set, thereby causing the output of the fourth 16-bit shift register 665 to be sent via multiplexer 686 onto the input bus 494. In addition, when this fourth INA instruction is performed, the DRLIN 476 will be brought back to zero and a reset ready line (RRLIN) 518 will be sent out and ANDed in gate 688 (see FIG. 18a) with the device address DA 1144, which will then clear the ENTER flip-flop 672, via OR gate 689, in order to terminate the INA instructions and cause the computer 68 to proceed to the next SKS instruction.

Referring once again to FIG. 3 of the drawings, the illustrated embodiment of the proposed radar data processing system also includes, in the overall control and display group 38, apparatus for controlling and displaying summary status data. In general, such apparatus enables the operator to monitor and evaluate system performance by providing him with the capability of requesting and displaying performance data from the computer 68. More specifically, the summary status control and display apparatus represented at 426 in FIG. 3 includes one or more control panels equipped with a series of pushbuttons and a keyboard which cooperate with the computer 68 to perform a variety of system control/display functions; i.e., the keyboard might be used to make numerical entries into the computer while the pushbuttons select and control the display and the use which is made of system track data. One such control panel has been previously referred to as the System Monitor and Control (SMAC) panel, for which controller apparatus is located in the display control converter 368 and controls data input from the SMAC panel into the computer 68 via the normal I/O channels and also receives output data from the computer, e.g., via the direct multiplex control (DMC) channels, and converts this output data into an appropriate composite video signal for display on a TV monitor.

In one practical embodiment, a typical SMAC panel contains a 12-key numeric keyboard with an associated 6-digit LED numeric readout and twenty function pushbuttons for entering data requests into the computer 68, via the associated controller unit which is located in display control converter 368 and whose operation is similar to the controller units already discussed. In this case, however, the controller is capable of operating in multiple modes; i.e., in one mode, an operator can request a detailed data readout from computer 68 on target parameters for a predetermined number (e.g. eight) of the most threatening targets in a selectable range, bearing, speed and approach angle sector.

For instance, if in the practical embodiment described above the operator wishes to interrogate the threats in, say, a range sector of between 10 and 100 miles, a bearing sector from 350° to 30°, a velocity between eight hundred and nine hundred knots, and an approach angle of 45°, he would proceed as follows:

1. He would first depress a SET pushbutton and then enter 10 on the keyboard and depress a range minimum enter button.
2. He would then enter 100 on the keyboard and then depress a range maximum enter button.
3. The operator would then enter 350 on the keyboard and then depress a first bearing limit enter button.
4. He would then enter 030 on the keyboard and depress a second bearing limit enter button.
5. To enter the velocity sector, the operator would enter 800 on the keyboard and depress a lower speed limit enter button.
6. He would then enter 900 on the keyboard and depress an upper speed limit enter button.
7. To enter approach angle, the operator would enter 045 on the keyboard and depress an approach angle enter button. He would then depress the SET pushbutton again to disable the various enter pushbuttons so that inadvertent values were not set in. This operator-selected data would be input to and processed by the computer 68 and, as a result, the computer 68 would output data identifying in detail the eight most threatening targets within the selected sector window. In a similar fashion, the operator can request detailed data from the computer 68 concerning any selected target track; i.e., for designation to a fire control system.

Figure 20:
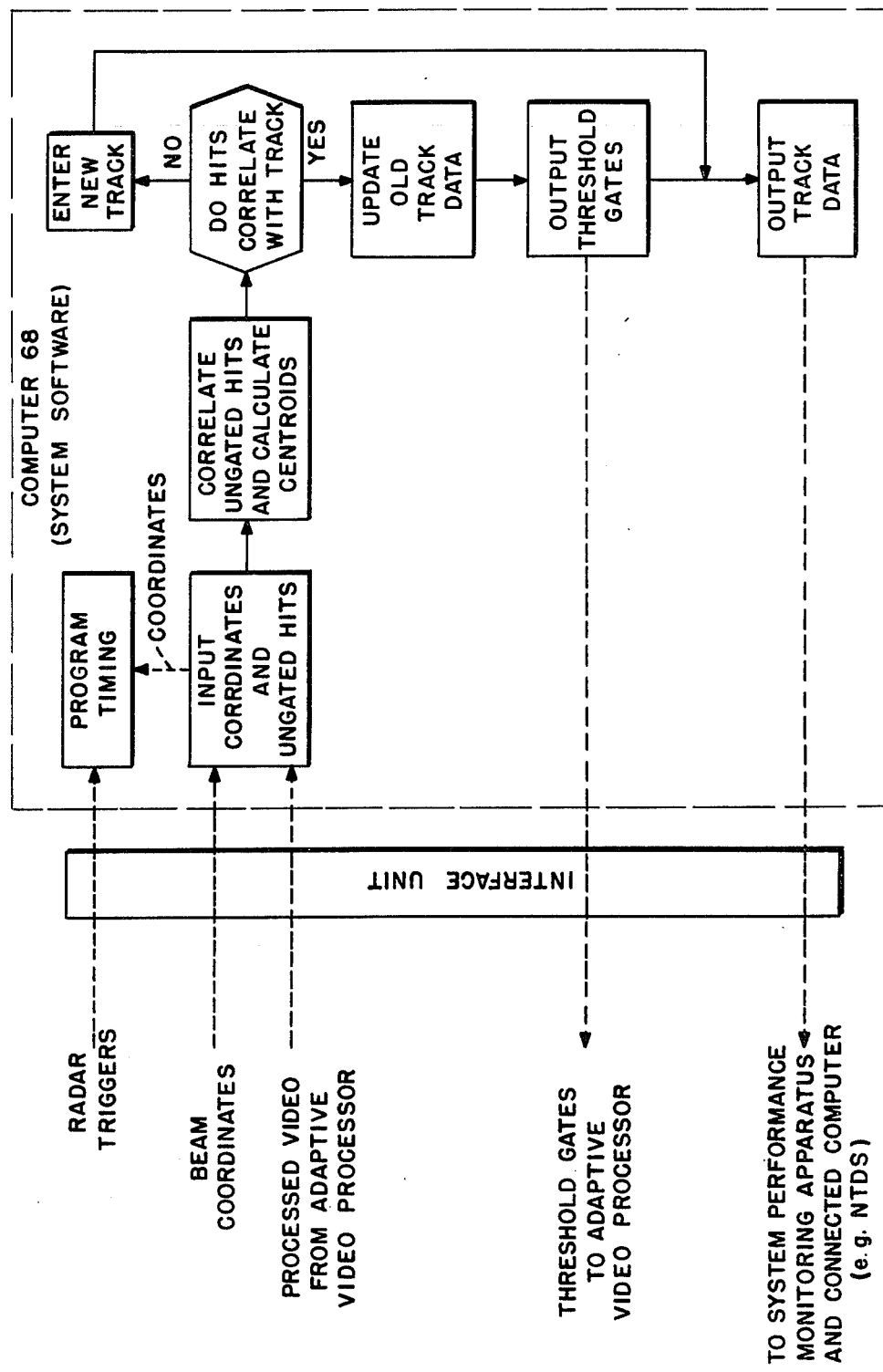
FIGS. 20, 21 and 22 are flow charts illustrating different program-controlled operations performed by the general purpose digital computer employed in the illustrated embodiment of the present invention.
Figure 21:
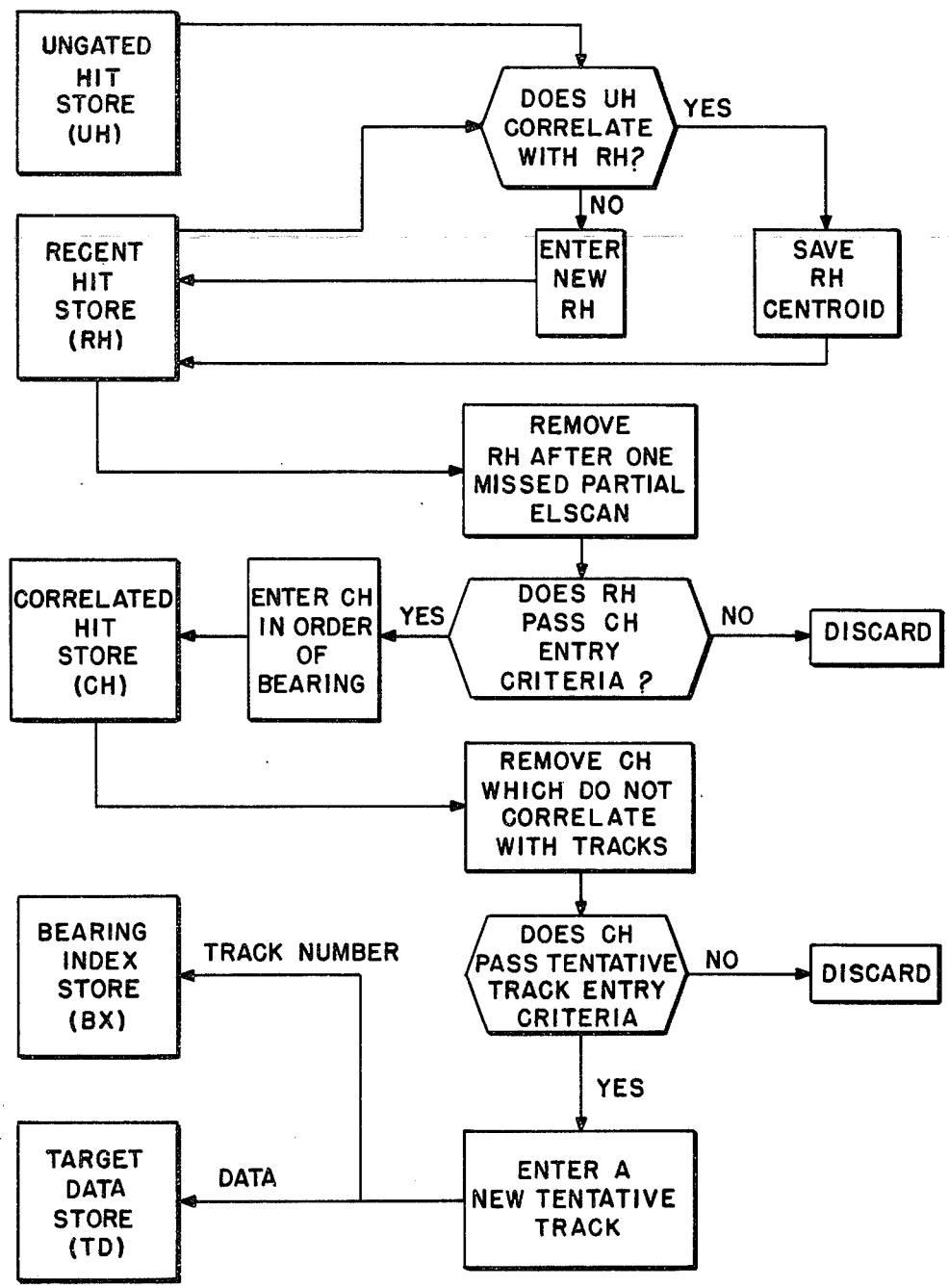
Figure 22:
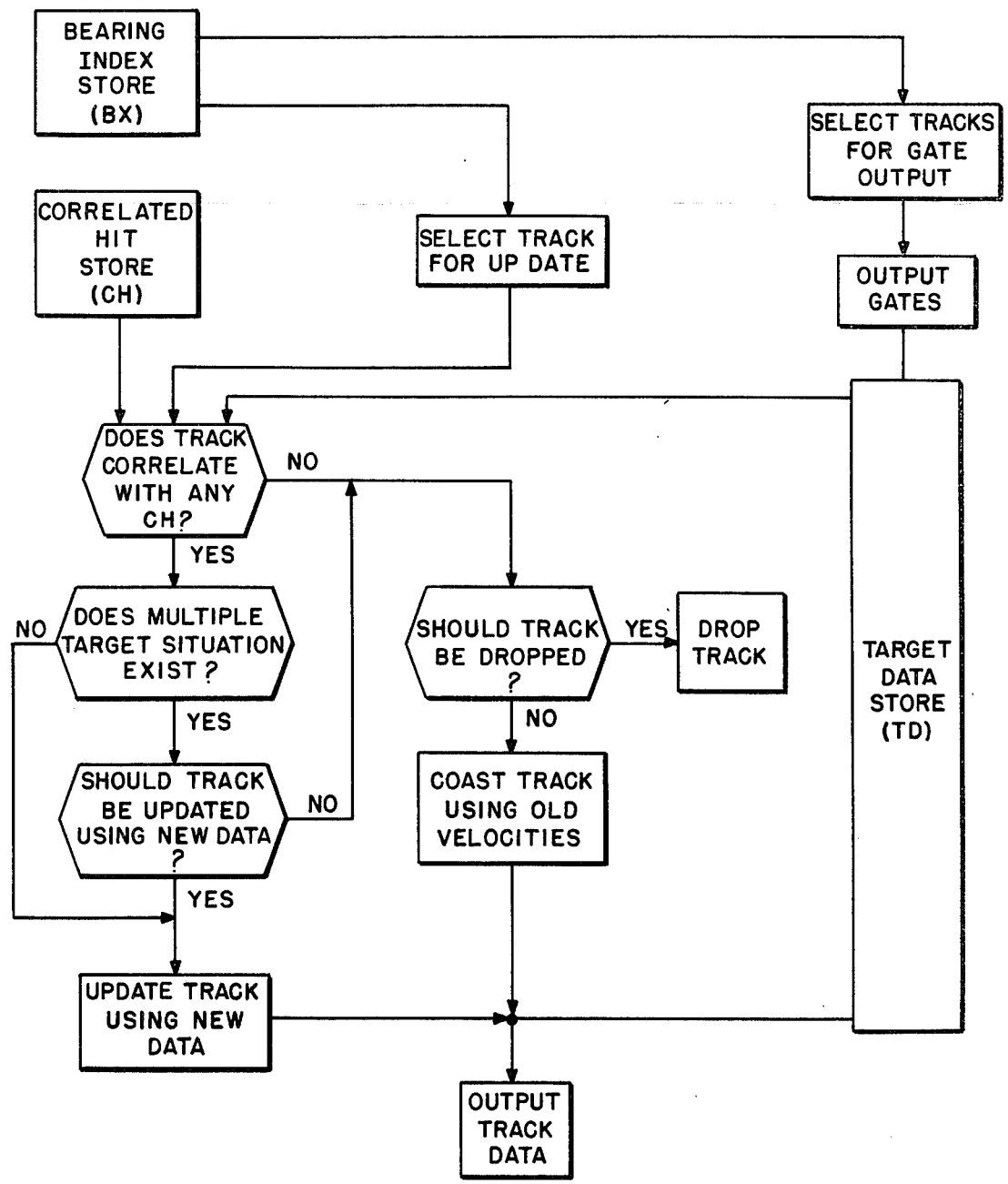

The system software can be thought of as a priority-interrupt driven system, which is controlled by various event-oriented executive routines. The executive routines determine the time and sequence in which all other routines in the program should be executed. The software is basically a hardware-controlled real-time system, in that program synchronization and timing is derived from externally generated triggers. To provide a clearer understanding of the operation of the system program, and show the relationship between program functions and the hardware, FIGS. 20 through 22 are provided for reference.

There are four major executive routines in the program employed, the details of all of which will become apparent to one skilled in the art.

1. The Cyclic Executive is the main routine that controls all low priority operations, such as azimuth-scan to azimuth-scan correlation, track file updates, and normal I/O communications, by keeping these functions synchronized with the radar azimuth scan. When there are no interrupts entered into the program, the program loops, in the Cyclic Executive, until an interrupt occurs. This routine is entered from the initialization routine, and program control is maintained within it. The other executive routines are all entered as a result of priority interrupts.

2. The second major executive routine is the Range Max Interrupt (RMI) routine. This routine is called up whenever a horizon trigger TH from the 3-D radar generates a priority interrupt. This routine will count the number of transmitted beams to remain synchronized with the elevation scan (elscan). Additionally, the RMI executive controls all high priority operations that must be synchronized with the individual radar transmissions. The main functions performed by the RMI executive routine are as follows:

a. Sets up buffers for input of coordinate and ungated hits, and keeps track of the number of ungated hits input during each radar dwell (beam group);

b. Converts sine and cosine input azimuth coordinates into a bearing angle;

c. Processes the ungated hits that were just input at the end of each elscan;

d. Packs the test target output word at each elscan;

e. Keeps track of radar zone changes in order to repack two blanking gates into the gate output word;

f. Checks the number of horizon and top of elscan triggers received, and counts the missed triggers;

g. Checks the input bearing and inhibits any backward movement of the current radar zone;

h. Detects the azimuth zero crossing, and saves the time of the past scan and the number of hits in that scan;

i. Sets flags that indicate that the counts, sweep, or ungated hit buffers are ready for output to the display and test routines.

After these high priority functions have been completed, program control is returned to the point of interrupt, generally in the Cyclic Executive routine.

3. The third routine is also part of the priority interrupt scheme. The elscan trigger ($R_{19}$) interrupt executive resets the beam counter used by the RMI Executive to keep the program synchronized with the radar elscan.

4. The last major routine, Process External Function (PREF) routine, serves a dual purpose. At the completion of each I/O data transfer, the program receives an interrupt that causes a jump to the PREF routine. The PREF routine will direct updated data over the I/O channel. Second, if an interrupt occurs, indicating an external function (EF) from say the fire control system (FCS) computer is ready to be input to the computer 68 of the proposed system, the PREF executive reads the external function word, checks the availability of direct memory access, decodes, and inputs the EF. The routine then calls the appropriate external function processing routine.

These four basic executive routines control the following four functional modules that comprise the software system:

a. Detection
b. Tracking
c. Threat Evaluation
d. I/O Communications

A. The target detection process performed by the computer 68 is illustrated in the flow chart of FIG. 21 and encompasses the beam-to-beam correlation, hit centroid calculations, and new track entry functions. Basically, the detection process begins with the ungated hits (UH) of each radar transmission, having passed the threshold and elevation correlations in the adaptive video processors (e.g., 60 in FIG. 3) being entered into one of two Ungated Hit stores. While one is used to collect hits during an elscan, the contents of the other UH store are being processed.

At the conclusion of an elscan, each entry in the Ungated Hit store is compared with the entries in the Recent Hit store (RH) to determine if any correlations have occured. If there is a correlation, the bearing of the new ungated hit is stored in the Recent Hit (RH) stores, and the number of hits for that RH is incremented. In the event that no correlation exists between the new UH and any RH entries, the ungated hit is immediately entered as a new Recent Hit so that it will be correlated with all subsequent ungated hits (UH). Thus, with one step the beam-to-beam vertical correlation, and elscan-to-elscan horizontal correlations, are accomplished.

After all ungated hits from one elscan have been processed, the RH store is searched to find any entries which have not been updated during the elscan. The elapsed scan count is then incremented for these entries. Each recent hit receiving a correlation remains in the Recent Hit store.

When a RH does not receive a correlation after a specified number of scans, it is tested against the Correlated Hit (CH) entry criteria which is a function of range and elevation. Any RH which does not satisfy the entry criteria is discarded, leaving only the latest entries in the RH store, thereby keeping the number of correlations to a minimum. This also eliminates the need for a UH/RH test on bearing correlation, since all RH are positioned at the current bearing. Valid detections are entered into the Correlated Hit store. Since the number of hits required to enter a Correlated Hit is set by the radar processor control logic (unit 422 in FIG. 3) as previously discussed, a check of the radar processing entry criteria is made.

Contents of the CH store are accumulated and correlated with the Track File (TF), when the radar beam is 30° beyond the bearing of new data. Those correlated hit entries which correlated with TF entries are used to update the Track File, while the remainder are entered as Tentative Tracks (TT) if they have the number of hits required.

B. Referring now to FIG. 22 of the drawings, that portion of the program which enables computer 68 to perform target tracking is illustrated in flow chart form. More particularly, there are three basic categories of tracks in the program: Tentative, Firm Air, and Stationary tracks. All detections are entered as Tentatives, and remain so until enough data are obtained to determine whether the track is a real target or a false track generated from clutter. Tentative tracks which are determined to be true air targets are then promoted to the Firm Air track category. Tracks which are determined to be very slow moving, or nonmoving, are entered as Stationary tracks. The Tentative and Firm Air track data are kept in one section of the Target Data store (TD), each of which is assigned a number from 1 to 225. This number locates the track data in the store. The Stationary tracks are kept in a separate part of the TD store, and are numbered from 256 to 511. The Stationary track section of the TD store is one-third the size of the Tentative/Firm Air store since no velocity data are kept on Stationary tracks.

Functionally, the automatic initiation of new tracks, and the automatic update of existing tracks are accomplished in these basic categories. To further define:

1. New Tentative — the first step in track initiation;

2. Tentative — the category of tracks that have not met the requirements to become Firm Air or Stationary tracks;

3. Firm Air — defines all established tracks with velocities greater than some predetermined value, such as 42 knots;

4. Stationary — the name given to fixed, or surface tracks, with velocities of less than 42 knots. Stationary tracks may be surface tracks, but also may represent clutter points of weather, land, etc.

As previously mentioned in the detection section, (A) above, the Correlated Hits (CH) are compared with the targets in the track store, and those which correlate are used for track update. A target is selected for update one each azimuth scan, with Stationary tracks updated first, followed by Firm Air and Tentative tracks, respectively.

The track update processing is synchronized for the radars by a routine that is initiated by the Cyclic Executive, whenever a bearing zone change occurs. The track data update zones lag the current radar zone so that adequate time is made available to complete the automatic target detection processing, before initiating the track update processing. As the radar proceeds in azimuth, Stationary tracks 14 zones behind the radar are removed from the Bearing Zone store. These are updated and reinserted, assuming they were not dropped. The 14 zone lag is introduced to ensure that all the hits in the particular zone of interest have been received even when subjected to severe ship roll and pitch conditions. Firm Air tracks 16 zones behind the radar, and Tentative tracks 21 zones behind the radar, are then updated. Finally, New Tentatives are entered, 24 zones behind the current radar zone. This sequence of updating ensures that all hits in the region of a Stationary track are tagged as such, and gives Firm Air tracks priority over Tentative tracks, in multiple target situations. If the program becomes very busy, the track updating may lag further than 14 zones behind the radar, with no ill effects.

Although specific details of the update procedure vary greatly with the type of track, the general functions within the target promotion logic are the same. Search windows or "gates" are provided, and are used in updating tracks, and in correlating CH with tracks.

Establishing a New Tentative track is the first phase automatic track initiation. The second phase is the retention of the track in a Tentative status until it has been firmly established.

The criteria for elevating a CH to a New Tentative are:

a. The CH bearing zone must be 24 zones behind the Current Radar Zone;

b. No previous tracking functions have been used in the CH for update purposes;

c. The number of Ungated Hits in the CH satisfies the hit count criteria for the current Radar Processing Control sector hit count;

d. A target number is available.

In the event that any of these conditions is unsatisfied, the CH is deleted from further processing.

The promotion of a track from a New Tentative to Tentative category requires one update. The first attempted update is with a small correlation window only, if a CH track has been placed in a "potential" Stationary category. Update of the New Tentative track with the large correlation window requires that an alpha-beta tracking filter be used, in conjunction with position velocity updates, to determine the future track position.

Tentative tracks remain in the Tentative category for six consecutive scans if the track is a "potential Stationary" track. If after six scans, the track has a velocity of less than 42 knots, and has not moved more than one-fourth nautical mile, the track is promoted to the category of a Stationary track. Those Tentative tracks with velocities greater than 42 knots remain in the Tentative category for a minimum of three consecutive scans, if certain velocity magnitude and stability criteria are satisfied.

Stationary track update involves a fixed correlation window. If a RH falls within the fixed correlation window, the position data are used to update the track. If, however, a RH does not fall within the correlation window, the position data are kept the same, and a counter is incremented to count the missed scans. If a specific number of missed scans occurs, the track is dropped.

Tentative tracks are promoted to Firm Air tracks after two azimuth scans if the program determines, by counting the number of hits per centroid, and the magnitude, that the track is strong enough. In most cases, they will become Firm Air Tracks after no more than six consecutive azimuth scans. Firm Air track update involves position/velocity updates, using alpha-beta filter tracking on an azimuth scan.

In one practical embodiment of the proposed system, once a target beyond a predetermined range, e.g., thirty two miles, is entered into Firm track, threshold gates are generated each scan at the predicted target position and sent to the adaptive video processor 60 of FIG. 3. These gates lower the adaptive processor threshold by 3 db, as previously described, in a ± ¼ nm range and ± 1.8° bearing window about each firm track. This increases the probability of detection of targets in track and thereby improves track solidarity, track accuracy and maximum tracking range.

C. A vital adjunct to the software system is the Threat Evaluation routine. Evaluation of threats is performed on all Firm Air, and Tentative moving tracks, which may be defined as those tracks whose velocities exceed some predetermined value. Using time-to-go to some predetermined minimum range as the basis of threat evaluation, threat priority is ordered by ascending values of time-to-go to this mininum range; i.e., the target with the minimum time-to-go is the highest priority threat. The operator, through one of the summary status controls (see 426 in FIG. 3) is able, as previously described, to select azimuth and range sector, target angle, and velocity envelopes within each threat evaluation to be performed. The Threat Evaluation routine is composed of several principal subroutines which function as follows:

a. The threat mode routine is the temporary executive of the Threat Evaluation routine, and is responsible for control and performance of threat evaluations and updates;

b. The search routine performs a search of the pointer store to find the target index;

b. The clear routine functions so as to clear four cells of the data file, and resets the initial index;

d. The reset routine searches the Threat Priority List to find a target number, and resets the priority list;

e. The time-to-go routine computes a Time-to-go to minimum range based on the targets closing rate;

f. The test sector routine tests to find whether a target is within a designated sector;

g. The test approach angle performs approach angle calculations;

h. The sequence routine arranges the threat sequence list.

Each of these subroutines is called up when certain function pushbuttons are depressed by the operator on the summary status control 426 of FIG. 3. As each subroutine is called up, threats are placed in a file and ordered by time-to-go to minimum range. At specific intervals, the data in the threat file is dumped to generate display data on a summary status display unit within apparatus of FIG. 3.

D. Communications within the proposed system is accomplished in a number of different ways, depending on the type or mode of operation. Communication with the adaptive video processor 60 of the radar video converter 32 is done on a dwell-by-dwell basis, and is, therefore, under the direction of the RMI executive and elscan executive routines; whereas, communication with any associated computer, such as a fire control computer, is accomplished via computer-to-computer interfacing.

As previously indicated, the data converter 66 inputs different priority interrupts to the computer 68, each indicating the occurrence of various associated events. When a priority interrupt is sensed by the computer 68, program control is transferred to a subroutine that is responsible for that interrupt. Each priority interrupt is assigned one location in memory to designate which routine is called when the interrupt occurs. In addition to the priority oriented interfaces between the data converter 66 and the computer 68, a normal I/O communications link is resident, primarily, in the Cyclic Executive described above to control the input and output of data between the computer and the display control converter 368 (see FIG. 3). This latter I/O link is controlled, as previously described, by various instructions within the program that address various display and control devices within the system (see subsystem denoted on 38 in FIG. 3).

More particularly and as was described hereinabove, if during the normal program cycle, the computer 68 is instructed to output data to a display device, the following events will occur:

a. The computer checks its Device Ready Line (DRLIN) 476 in FIG. 15 to see if the device is ready to receive data.

b. The computer places the address of the device on its address bus.

c. Simultaneously, the output word is placed on the output bus of the computer, OTB (line 508 in FIG. 15).

d. The display control converter 368 decodes the address bus and strobes the contents of the output bus into the appropriate device buffer.

e. The computer then sets the reset ready line (RRLIN), e.g., 502 in FIG. 15, and resets the DRLIN thereby ending the data transmission. Although this sequence remains essentially the same for all display devices, some devices may contain several addresses, as noted above, thereby requiring several output instructions to complete the display of any one device.

Conversely, the procedure for inputting data from a control/display device to the computer is somewhat different. When such a device has data to be input to the computer, the following events transpire, as discussed above:

a. The device places the data to be input to the computer on the input bus INB (e.g., see line 494 in FIG. 15) and sets an enter flip-flop in the display control converter apparatus.

b. During the normal cycle of the program the computer performs a general interrogation cycle in which all enter flip-flops are checked (see F/F 468 in FIG. 15).

c. If any device enter flip-flop is set, the program skips and performs a series of specific address interrogation cycles in which all enter flip-flops are checked individually.

d. If during this interrogation cycle, a specific addressed enter flip-flop is set, indicated by the DRLIN, the program skips again and performs an input instruction.

e. The input instruction is performed at which time the data on the addressed input bus is strobed into the computer.

f. The computer then outputs a RRLIN to clear the enter flip-flop in the display control converter and cycles to the next interrogation address.

The data that is input to the computer is then cycled in the program to perform the appropriate control function, the computer program knowing what the input data is to do because of coding set up in the program and the specific interrogation instruction in which a skip occurred.

It should be apparent from the foregoing description that the proposed system of the present invention is capable of performing, by means including a programmed digital purpose computer, the improved detecting, tracking, and processing of surveillance radar signals, Moreover, the present invention may be implemented without requiring modification to existing radars or associated display equipment, it improves significantly target detection and tracking in both natural and countermeasures degraded environments, and it enables a human operator to assume a more supervisory function wherein he can exercise control over target detection parameters of the system and track correlation criteria in the data processor to accomodate varying radar signal environments. The proposed system is particularly applicable to providing more accurate target designation to a shipboard fire control system.

Various modifications, adaptations and alterations to the illustrated embodiment are of course possible in light of the above teachings. It should therefore be understood that within the scope of the appended claims the invention may be practiced otherwise than as was specifically described hereinabove.

What is claimed is:

1. An automatic system for processing data from a radar system in accordance with the radar video returns, radar coordinate signals and radar trigger pulses produced within radar system comprising, in combination, video processor circuit means for processing said radar video returns for overlapping radar beam groups to produce processed video output signals indicating when the radar video returns in each beam group exceed a threshold level indicating the presence of a radar target, said video processor circuit means including threshold level generating circuit means for causing said threshold level to vary in accordance with the magnitude of radar video returns in a plurality of radar resolution cells adjacent a resolution cell of interest in both range and elevation, whereby said threshold level is adaptive to the radar environment of said cell of interest, and programmed computer means responsive to said processed video output signals, said radar coordinate signals and said radar trigger pulses for storing and updating continuously data defining target tracks.

2. The automatic radar data processing system specified in claim 1 further including delay circuit means, said radar video returns corresponding to the resolution cell of interest being applied to said delay circuit means in order to permit the generation of the adaptive threshold level associated with the resolution cells adjacent said cell of interest and the subsequent comparison of the radar video returns for said cell of interest with said associated adaptive threshold level on a common time scale.

3. The automatic radar data processing system specified in claim 1 further including means to perform beam-to-beam correlation of said processed video output signal between adjacent radar beams.

4. The automatic radar data processing system specified in claim 2 wherein said adaptive threshold level generating circuit means generates a plurality of different threshold levels each corresponding to a different false alarm rate and further including manually controlled means for selecting between said different threshold levels and thereby establishing a desired false alarm rate for said processed video output signal.

5. The automatic radar data processing system specified in claim 1 wherein said radar system is a three-dimensional system capable of scanning in elevation and further including means responsive to the magnitude of radar video returns in each beam group being processed for producing a signal defining the position of each target in elevation.

6. The automatic radar data processing system specified in claim 1 wherein said threshold level generating circuit means includes, counter means for registering a count corresponding to the extent to which the radar video return exceeds said associated adaptive threshold level, and means to adjust said threshold level in proportion to the count registered by said counter means, whereby said threshold level continuously adapts to the magnitude of radar video returns in the resolution cells adjacent said cell of interest.

7. The automatic radar data processing system specified in claim 1 wherein said video processor circuit means further includes means for processing radar video returns from a two-dimensional surveillance radar unit.

8. The automatic radar data processing system specified in claim 1 further including operator-controlled means for selectively controlling the threshold level in any desired sector of the surveillance volume of said radar system.

9. The automatic radar data processing system specified in claim 1 wherein said programmed computer stores track data regarding radar targets in categories corresponding to tentative, stationary and firm radar target tracks.

10. The automatic radar data processing system specified in claim 9 wherein said computer is programmed to store initially a newly detected radar target as a tentative target track and to subsequently compare each stored track to subsequently detected targets for updating the position of each stored track and determining whether a particular target track stored initially as tentative should be converted to either a firm or stationary target track category.

11. The automatic radar data processing system specified in claim 9 further including display means, and manually operated control means operably connecting said computer to said display means for selecting target track data to be removed from computer storage and displayed.

12. The radar data processing system specified in claim 11 wherein said display means includes means for displaying the total number of target tracks in each different category stored in said computer.

13. The automatic radar data processing system specified in claim 11 wherein said control means includes means enabling an operator to select for display the target activity in any of a plurality of predetermined sectors within the surveillance volume of said radar system.

14. The automatic radar data processing system specified in claim 13 wherein said control means includes means enabling the operator to define the data to be displayed according to range, bearing, speed and approach angle of potential threat targets.

15. The radar data processing system specified in claim 13 wherein said display means includes means for indicating the target activity level within each predetermined sector of the surveillance volume of said radar and said control means includes operator-controlled selection means enabling an operator to set the threshold level in any desired sector and to establish track categorization logic within said computer means.

16. The automatic radar data processing system specified in claim 14 wherein said control means includes means enabling the operator to adjust the size or extent of said predetermined sectors of the surveillance volume of said radar.

17. The automatic radar data processing system specified in claim 11 further including controller means for interfacing said display means and said control means with said computer for communicating data requests from said control means to said computer and communicating data for display from said computer storage to said display means.

18. The automatic radar data processing system specified in claim 17 wherein said display means includes a plurality of display devices and said control means includes a plurality of control devices, said controller means enabling said computer means to sequentially interrogate said control devices and sequentially actuate said display devices.

19. The automatic radar data processing system specified in claim 11 wherein said display means includes means to provide a scan history display of the position of a selected target over a predetermined number of successive radar scans.

20. The automatic radar data processing system specified in claim 9 further including gating means controlled by track data stored in said programmed computer means for lowering said threshold level in the vicinity of the predicted location of a target being tracked in order to improve track continuity.

* * * * *